US009670359B2

(12) United States Patent
Kaito et al.

(10) Patent No.: US 9,670,359 B2
(45) Date of Patent: Jun. 6, 2017

(54) POLYCARBONATE RESIN COMPOSITION AND MOLDED ARTICLE

(71) Applicant: MITSUBISHI CHEMICAL CORPORATION, Tokyo (JP)

(72) Inventors: Hiroyoshi Kaito, Fukuoka (JP); Haruo Sasaki, Fukuoka (JP); Masashi Yokogi, Fukuoka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/968,519

(22) Filed: Aug. 16, 2013

(65) Prior Publication Data
US 2013/0331514 A1  Dec. 12, 2013

Related U.S. Application Data

(63) Continuation of application No. PCT/JP2012/053556, filed on Feb. 15, 2012.

(30) Foreign Application Priority Data

Feb. 16, 2011 (JP) ................................ 2011-030736

(51) Int. Cl.
C08G 67/02 (2006.01)
C08G 63/02 (2006.01)
C08G 63/18 (2006.01)
C08L 69/00 (2006.01)
C08K 5/00 (2006.01)

(52) U.S. Cl.
CPC ............ C08L 69/00 (2013.01); C08K 5/0041 (2013.01)

(58) Field of Classification Search
None
See application file for complete search history.

(56) References Cited

U.S. PATENT DOCUMENTS

| 7,816,444 B2 | 10/2010 | Kamps et al. |
| 8,445,624 B2 | 5/2013 | Fuji et al. |
| 2008/0011513 A1 | 1/2008 | Kamps et al. |
| 2009/0105444 A1* | 4/2009 | Chatterjee et al. ........... 528/196 |
| 2011/0034646 A1 | 2/2011 | Fuji et al. |

FOREIGN PATENT DOCUMENTS

| CN | 101501135 A | 8/2009 |
| CN | 101896535 A | 11/2010 |
| EP | 2 371 877 A1 * | 10/2011 |
| JP | 2005-132970 | 5/2005 |
| JP | 2007-176972 | 7/2007 |
| JP | 2008-285529 | 11/2008 |
| JP | 2009-035691 * | 2/2009 |
| JP | 2009-067970 | 4/2009 |
| JP | 2009-161745 | 7/2009 |
| JP | 2010-528143 A | 8/2010 |
| JP | 2011-001455 | 1/2011 |
| JP | 2011-500912 | 1/2011 |
| JP | 2011-21171 | 2/2011 |
| JP | 2013-203931 A | 10/2013 |
| WO | 2010/061927 | 3/2010 |
| WO | WO 2010/061927 * | 6/2010 |

OTHER PUBLICATIONS

Machine translation of Nagashima et al. JP 2009-035691, pp. 1-30.*
International Search Report issued Apr. 17, 2012 in PCT/JP2012/053556 filed on Feb. 15, 2012.
U.S. Appl. No. 14/041,397, filed Sep. 30, 2013, Yokogi, et al.
U.S. Appl. No. 14/041,482, filed Sep. 30, 2013, Sasaki, et al.
U.S. Appl. No. 14/041,883, filed Sep. 30, 2013, Sasaki, et al.
U.S. Appl. No. 13/970,205, filed Aug. 19, 2013, Yokogi, et al.
Combined Chinese Office Action and Search Report issued Jul. 15, 2014 in Patent Application No. 201280009001.1 (with English language translation).
$2^{nd}$ Notification of Office Action in corresponding Chinese Patent Application No. 201280009001.1 issued on Jan. 6, 2015 with English-language translation thereof.
Information Offer Form issued Aug. 4, 2015 in Japanese Patent Application No. 2012-031119, filed Feb. 15, 2012 (with English Translation).
Decision of Rejection issued on May 6, 2015 in corresponding Chinese Patent Application No. 2012800009001.1 with attached English language translation.
An Information Offer Form submitted in the corresponding Japanese patent application No. 2012-031 119 with English translation.
Office Action issued Jan. 12, 2016 in Chinese Patent Application No. 201280009001.1 (with English language translation).
Office Action issued Oct. 13, 2015 in Japanese Patent Application No. 2012-031119 (with English language translation).
Office Action, Issued Apr. 5, 2016, in corresponding Japanese Patent Application No. 2012-031119, with English translation.

* cited by examiner

Primary Examiner — Susannah Chung
Assistant Examiner — Robert T Butcher
(74) Attorney, Agent, or Firm — Oblon, McClelland, Maier & Neustadt, L.L.P.

(57) ABSTRACT

An object of the present invention is to provide a polycarbonate resin composition and a molded article, which are excellent in jet-blackness, image sharpness, impact resistance, scratch resistance owing to high hardness, flame retardancy and heat retention stability. The present invention provides a resin composition comprising a polycarbonate resin comprising a structural unit derived from a cyclic ether structure-containing dihydroxy compound and a coloring agent, which is a polycarbonate resin composition having an L* value of 6 or less as measured by the reflected light method of JIS K7105; and a molded article using the resin composition. The resin composition and the molded article of the present invention can be used over a wide range of fields allowing a product to be imparted with a high-grade appearance and a dignified impression.

13 Claims, No Drawings

POLYCARBONATE RESIN COMPOSITION AND MOLDED ARTICLE

TECHNICAL FIELD

The present invention relates to a resin composition excellent in jet-blackness, image sharpness, impact resistance, scratch resistance owing to high surface hardness, flame retardancy and heat retention stability, and a molded article.

BACKGROUND ART

In recent years, with the progress toward thinning, compacting and large-sizing of the molded article formed by molding a resin composition, demands for enhancing various physical properties of the molded article are increasing. Particularly, in the application as housings for electric, electronic and Office Automation (OA) devices, automotive interior or exterior parts, other daily life-related exterior parts, and the like, the molded article is required to have a deep-tone jet-blackness and image sharpness for imparting a high-grade appearance and at the same time, have flame retardancy and heat retention stability.

To meet such a requirement, a resin composition prepared by comprising a dye or a pigment into various resins, and a resin molded article formed by molding the resin composition have been proposed (Patent Documents 1 to 4).

BACKGROUND ART DOCUMENT

Patent Document

Patent Document 1: JP-A-2007-176972 (the term "JP-A" as used herein means an "unexamined published Japanese patent application")
Patent Document 2: JP-A-2009-35691
Patent Document 3: JP-A-2005-132970
Patent Document 4: JP-A-2009-67970

SUMMARY OF INVENTION

Problem that Invention is to Solve

However, it has been difficult for any of these methods to realize high-level jet-blackness and image sharpness in a molded article of the resin composition. Also, the flame retardancy and heat retention stability in an exterior part are not enough to withstand practical use. In addition, the dye or pigment used must satisfy specific conditions in many cases, and this makes the production difficult.

Under these circumstances, a resin composition having deep-tone jet-blackness and image sharpness, and a molded article thereof are demanded. Furthermore, a resin composition and a molded article, where impact resistance, scratch resistance owing to high surface hardness, flame retardancy and heat retention stability are additionally balanced at a high level, are demanded.

An object of the present invention is to solve those conventional problems and provide a resin composition and a molded article, each having deep-tone jet-blackness and image sharpness and at the same time, having all of impact resistance, scratch resistance, flame retardancy and heat retention stability.

Means for Solving Problem

The present inventors have repeated intensive studies, as a result, found that when a polycarbonate resin comprising a structural unit derived from a cyclic ether structure-containing dihydroxy compound and a coloring agent, which is a polycarbonate resin composition having an L* value of 6 or less as measured by the reflected light method of JIS K7105 (1981), is measured for the color tone in accordance with JIS Z8729 (2004), unexpectedly, the L* value is extremely low and the blackness degree is high. The present invention has been accomplished based on this finding. Also, the above polycarbonate resin composition above has high impact resistance and at the same time, has high surface hardness. Furthermore, it has been found that a resin composition and a molded article, each satisfying jet-blackness and image sharpness and at the same time, satisfying both flame retardancy and heat retention stability, beyond ordinary expectation, can be provided.

That is, the gist of the present invention resides in the following [1] to [16].

[1] A polycarbonate resin composition comprising a polycarbonate resin comprising a structural unit derived from a cyclic ether structure-containing dihydroxy compound and a coloring agent, which is a polycarbonate resin composition having an L* value of 6 or less as measured by the reflected light method of JIS K7105.

[2] The polycarbonate resin composition as described in the above [1], wherein the content of the coloring agent comprised in the polycarbonate resin composition is from 0.001 to 3 parts by mass per 100 parts by mass of the polycarbonate resin.

[3] The polycarbonate resin composition as described in any one of the above [1] or [2], wherein the coloring agent comprises a coloring agent having a maximum absorption wavelength in the range of 550 to 600 nm, a coloring agent having a maximum absorption wavelength in the range of 580 to 680 nm, and a coloring agent having a maximum absorption wavelength in the range of 640 to 690 nm.

[4] The polycarbonate resin composition as described in any one of the above [1] to [3], wherein the coloring agent is an organic dye.

[5] The polycarbonate resin composition as described in any one of the above [1] to [4], wherein the cyclic ether structure-containing dihydroxy compound is a dihydroxy compound represented by the following formula (3):

[Chem. 1]

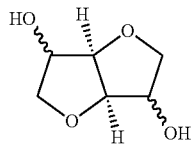

(3)

[6] The polycarbonate resin composition as described in any one of the above [1] to [5], wherein the polycarbonate resin further has a structural unit derived from a dihydroxy compound of an aliphatic hydrocarbon having a carbon number of 2 to 20.

[7] The polycarbonate resin composition as described in any one of the above [1] to [6], wherein the polycarbonate resin comprises from 40 to 90 mol % of a structural unit derived from a cyclic ether structure-containing dihydroxy compound and from 60 to 10 mol % of a structural unit derived from an aliphatic dihydroxy compound, based on structural units derived from all dihydroxy compounds.

[8] The polycarbonate resin composition as described in any one of the above [1] to [7], which comprises from 0.0001 to 5 parts by mass of an antioxidant per 100 parts by mass of the polycarbonate resin.
[9] The polycarbonate resin composition as described in any one of the above [1] to [8], which comprises from 0.01 to 30 parts by mass of a flame retardant per 100 parts by mass of the polycarbonate resin.
[10] The polycarbonate resin composition as described in any one of the above [1] to [9], which comprises from 0.01 to 30 parts by mass of a hindered amine-based light stabilizer per 100 parts by mass of the polycarbonate resin.
[11] The polycarbonate resin composition as described in any one of the above [1] to [10], wherein the polycarbonate resin is obtained by polycondensation of a cyclic ether structure-containing dihydroxy compound and a carbonic acid diester represented by the following formula (2):

[Chem. 2]

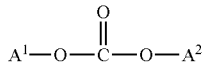

(2)

(in formula (2), $A^1$ and $A^2$ each independently represent a substituted or unsubstituted aliphatic group having a carbon number of 1 to 18 or a substituted or unsubstituted aromatic group, and $A^1$ and $A^2$ may be the same or different).
[12] The polycarbonate resin composition as described in any one of the above [1] to [11], wherein the polycarbonate resin composition comprises 700 ppm by mass or less of an aromatic monohydroxy compound.
[13] The polycarbonate resin composition as described in any one of the above [1] to [12], wherein the polycarbonate resin composition comprises 60 ppm by mass or less of a carbonic acid diester represented by the following formula (2):

[Chem. 3]

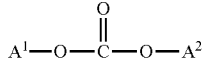

(2)

(in formula (2), $A^1$ and $A^2$ each independently represent a substituted or unsubstituted aliphatic group having a carbon number of 1 to 18 or a substituted or unsubstituted aromatic group, and $A^1$ and $A^2$ may be the same or different).
[14] The polycarbonate resin composition as described in any one of the above [1] to [13], wherein the polymerization temperature of the polycarbonate resin is less than 250° C.
[15] A polycarbonate resin molded article obtained by molding the polycarbonate resin composition as described in any one of the above [1] to [14].
[16] The polycarbonate resin molded article as described in the above [15], wherein the polycarbonate resin molded article is molded by the injection molding method.

Effects of Invention

According to the present invention, a resin composition and a molded article, each having deep-tone jet-blackness and image sharpness and at the same time, having all of impact resistance, surface scratch resistance, flame retardancy and heat retention stability, are obtained. Specifically, as regards a resin composition having an $L^*$ value of 6 or less as measured by the conventionally known reflected light method of JIS K7105, when a resin composition having an almost equivalent $L^*$ value is measured for the color tone in accordance with JIS Z8729, unexpectedly, the $L^*$ value is extremely low and the blackness degree is high, ensuring deep-tone jet-blackness and high image sharpness.
(1) Jet-Blackness
The resin composition and the molded article of the present invention take on deep-tone jet-blackness, and even a composition having an almost equivalent $L^*$ value as measured by the reflected light method of JIS K7105 (1981), when measured for the color tone in accordance with JIS Z8729 (2004), exhibits an extremely low L value and takes on particularly deep-tone jet-blackness.
(2) Impact Resistance
A molded article of the resin composition as measured by a Charpy impact test (unit: kg-cm/cm$^2$) based on JIS K7111 (2006) shows an excellent result in the Charpy impact test, and a 3 mm-thick molded article of the resin composition of the present invention shows a particularly excellent result of 5 kJ/m$^2$ or more in a result of the Charpy impact test when measured according to JIS K7111.
(3) Scratch Hardness
In the present invention, the scratch hardness of the molded article of the resin composition is evaluated in accordance with JIS K5600-5-4 (1999), and the scratch hardness of the resin composition of the present invention is higher than the hardness of conventionally known resin compositions.
(4) Flame Retardancy
The result of the vertical burning test according to UL94 standards is V-2 or more, showing appropriate flame retardancy.
(5) Heat Retention Stability
Residence molding is performed by taking molding for 5 minutes as one cycle, and the surface of the retention molded article in 5th shot or later is free from roughening due to a silver streak.

Such a resin composition and a molded article can be used over a wide range of fields allowing a product to be imparted with a high-grade appearance and a dignified impression and can be expected to find their application, for example, in housings for electric, electronic and OA devices, automotive interior or exterior parts, and other daily life-related exterior parts.

MODE FOR CARRYING OUT INVENTION

The mode for carrying out the invention is described in detail below, but the explanations made on constituent elements are one example (representative example) of the embodiment of the present invention, and the present invention is not limited to the following contents unless the invention departs from the spirit thereof.

Incidentally, in the description of the present invention, "mass %", "ppm by mass" and "parts by mass" have the same meanings as "wt %", "ppm by weight" and "parts by weight", respectively. Also, when simply referred to as "ppm", this means "ppm by weight".
<Resin Composition>
The resin composition of the present invention is a resin composition comprising a polycarbonate having a structure derived from a cyclic ether structure-containing dihydroxy compound and a coloring agent, and this is (1) a resin composition having an L* value of 6 or less as measured by the reflected light method of JIS K7105.

L* Value

The L* value of the resin composition according to the present invention is a value as measured in accordance with JIS K7105 (1981), and after forming a molded article for normal measurement, the L* value of the molded article is measured, but when a molded article is already formed, the measurement may be performed by creating a measurable state, for example, by partially cutting the molded article, and the shape thereof is not limited. The method for forming a molded article is not particularly limited but includes, for example, a method of preparing a plate-like molded article (90 mm×50 mm×3 mm (thickness)) by injection molding and measuring it by means of a spectral colorimeter (reflection method), Model SE2000, manufactured by Nippon Denshoku Kogyo K.K. In this case, as for the injection molding conditions, a resin composition pellet is preferably dried at 110° C. for 4 hours or more and then molded using an injection molding machine, Model M150AII-SJ, manufactured by Meiki Co., Ltd., under the conditions of a cylinder temperature of 270° C., a mold temperature of 80° C. and a molding cycle of 55 seconds such that the maximum height Rz of a contour curve specified in JIS B0601 (2001) is 0.2 μm or less and the average length RSm of the contour curve element is 25 μm or less. The L* value as measured by the reflected light method of JIS K7105 of a 3 mm-thick molded article of the resin composition of the present invention is usually 6 or less, preferably 5 or less, more preferably 4 or less, still more preferably 3 or less, yet still more preferably 2 or less.

<Coloring Agent>

In order to adjust the L* value as measured by reflected light of a molded article of the resin composition of the present invention to 6 or less, various coloring agents are appropriately incorporated so as to reduce the optical reflectance in the visible region to a fixed value or less. More specifically, the coloring agent is incorporated such that the maximum reflectance in the wavelength region of 400 to 800 nm is usually 0.1% or more and usually 5% or less, preferably 3.5% or less, more preferably 3% or less. At this time, coloring agents are used by combining their kinds and amounts so that the maximum reflectance in the wavelength region of 400 to 800 nm can finally fall in the range above. The coloring agent used is selected to make low the maximum reflectance in the wavelength region of 400 to 800 nm. The resin composition comprising a polycarbonate resin of the present invention is thus adjusted to have an L* value of 6 or less, whereby excellent image sharpness is obtained and a molded article having jet-blackness excellent in the design property can be realized. As for the coloring agent, a plurality of coloring agents differing in the maximum absorption wavelength may be used in combination, but if the number of kinds of coloring agents or the amount of the coloring agent is too large, the effect of reflection or scattering of light by the coloring agent may become large to reduce the image sharpness.

The coloring agent for use in the present invention includes a dye and a pigment, such as inorganic pigment, organic pigment and organic dye, and is not particularly limited as long as coloring can be attained. The coloring agent is described in detail below.

Specific examples of the inorganic pigment include carbon black; and an oxide-based pigment such as titanium oxide, zinc oxide, red oxide, chromium oxide, iron black, titanium yellow, zinc-iron brown, copper-chromium black and copper-iron black.

Specific examples of the organic pigment and the organic dye include a phthalocyanine-based dye or pigment; a condensed polycyclic dye or pigment such as azo type, thioindigo type, perinone type, perylene type, quinacridone type, dioxazine type, isoindolinone type and quinophthalone type; and a dye or pigment of anthraquinone type, perinone type, perylene type, methine type, quinoline type, heterocyclic type or methyl type.

As the coloring agent used in the present invention, it is preferred to use a coloring agent having at least a maximum absorption wavelength in the range of 550 to 600 nm, a coloring agent having at least a maximum absorption wavelength in the range of 580 to 680 nm, and a coloring agent having at least a maximum absorption wavelength in the range of 640 to 690 nm.

Examples of the coloring agent having at least a maximum wavelength in the range of 550 to 600 nm include Solvent Violet 13, Solvent Violet 14, Solvent Violet 31, Solvent Violet 36, Solvent Violet 33, and Solvent Violet 49.

Examples of the coloring agent having at least a maximum wavelength in the range of 580 to 680 nm include Solvent Blue 35, Solvent Blue 36, Solvent Blue 63, Solvent Blue 78, Solvent Blue 83, Solvent Blue 87, Solvent Blue 94, and Solvent Blue 97.

Examples of the coloring agent having at least a maximum wavelength in the range of 640 to 690 nm include Solvent Green 3, Solvent Green 5, Solvent Green 20, and Solvent Green 28.

Furthermore, a coloring agent having at least a maximum wavelength in the range of 400 to 460 nm or a coloring agent having at least a maximum wavelength in the range of 480 to 550 nm may be incorporated.

Examples of the coloring agent having at least a maximum wavelength in the range of 400 to 460 nm include Solvent Yellow 14, Solvent Yellow 16, Solvent Yellow 33, Solvent Yellow 93, Solvent Yellow 104, Solvent Yellow 114, Solvent Yellow 157, Solvent Yellow 163, and Solvent Yellow 167.

Examples of the coloring agent having at least a maximum wavelength in the range of 480 to 550 nm include Solvent Red 52, Solvent Red 111, Solvent Red 135, Solvent Red 143, Solvent Red 145, Solvent Red 146, Solvent Red 149, Solvent Red 150, Solvent Red 151, Solvent Red 168, Solvent Red 179, Solvent Red 191, Solvent Red 207, and Solvent Red 227.

The coloring agent for use in the present invention preferably has a molecular weight of 280 to 1,000, more preferably from 300 to 600. If the molecular weight is less than 280, the coloring agent may contaminate the mold or roll during molding and a molded article excellent in the surface appearance may not be obtained, whereas if the molecular weight exceeds 1,000, miscibility for the resin is insufficient and deep-tone jet-blackness may not be obtained.

Among these, in view of colorability, jet-blackness, depth and clarity, at least an anthraquinone-based dye is preferably used.

The anthraquinone-based dye includes dyes commercially available under the color index such as Solvent Red 52, Solvent Red 111, Solvent Red 149, Solvent Red 150, Solvent Red 151, Solvent Red 168, Solvent Red 191, Solvent Red 207, Disperse Red 22, Disperse Red 60, Disperse Violet 31, Solvent Blue 35, Solvent Blue 36, Solvent Blue 63, Solvent Blue 78, Solvent Blue 83, Solvent Blue 87, Solvent Blue 94, Solvent Blue 97, Solvent Green 3, Solvent Green 20, Solvent Green 28, Disperse Violet 28, Solvent Violet 13, Solvent Violet 14 and Solvent Violet 36.

One of these coloring agents may be used alone, or two or more thereof may be used in combination. The combination of coloring agents is not particularly limited, but use of a coloring agent composed of two or more dyes comprising at least an anthraquinone-based dye is preferred, and use of two or more anthraquinone-based dyes is more preferred.

If the number of kinds of coloring agents or the amount of the coloring agent is too large, the effect of reflection or scattering of light by the coloring agent may become large to reduce the image sharpness of the polycarbonate resin composition. Accordingly, for improving the image sharpness of the polycarbonate resin composition, the number of kinds of coloring agents used and the amount of the coloring agent used are preferably small. In order to obtain high image sharpness, the total amount of the coloring agent is preferably from 0.001 to 3 parts by mass, more preferably 0.005 parts by mass or more, still more preferably 0.01 parts by mass or more, and preferably 3 parts by mass or less, more preferably 2 parts by mass or less, still more preferably 1 part by mass or less, per 100 parts by mass of the polycarbonate resin.

In this way, the L* value is set to 6 or less, preferably 5 or less, whereby a molded article having good jet-blackness with deeper depth can be realized.

<Polycarbonate Resin>

The polycarbonate resin for use in the polycarbonate resin composition of the present invention comprises a structural unit derived from a cyclic ether structure-containing dihydroxy compound.

The polycarbonate resin can be obtained, for example, by polycondensation of a cyclic ether structure-containing dihydroxy compound and a carbonic acid diester represented by the following formula (2) in the presence of a catalyst.

[Chem. 4]

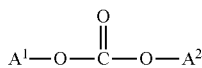

(2)

(in formula (2), $A^1$ and $A^2$ each independently represent a substituted or unsubstituted aliphatic group having a carbon number of 1 to 18 or a substituted or unsubstituted aromatic group, and $A^1$ and $A^2$ may be the same or different).

(Dihydroxy Compound)

The polycarbonate resin for use in the present invention is obtained by polycondensation through a transesterification reaction using a cyclic ether structure-containing dihydroxy compound (hereinafter, sometimes referred to as "dihydroxy compound of the present invention") and a carbonic acid diester as raw materials.

The dihydroxy compound of the present invention includes cyclic ether structure-containing dihydroxy compounds typified by the following formulae (3), (4) and (5).

Among these dihydroxy compounds, from the standpoint of increasing the heat resistance, anhydrous sugar alcohol structure-containing compounds typified by the following formula (3) and Spiro glycol structure-containing compounds typified by the following formulae (4) and (5) are preferred, and compounds having a plurality of ring structures, typified by the following formulae (3) and (4), are more preferred.

One of these may be used alone, or two or more thereof may be used in combination, according to the performance requirements of the obtained polycarbonate resin and polycarbonate resin composition.

[Chem. 5]

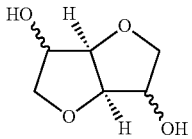

(3)

[Chem. 6]

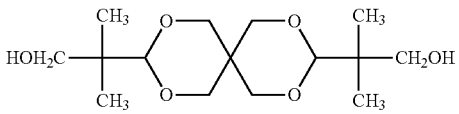

(4)

[Chem. 7]

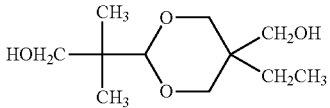

(5)

The dihydroxy compound represented by formula (3) includes isosorbide, isomannide, and isoidide, which are stereoisomers. One of these compounds may be used alone, or two or more thereof may be used in combination.

In view of availability, ease of production, moldability, heat resistance, impact resistance, surface hardness, flame retardancy, heat retention stability and carbon neutrality, isosorbide obtained by dehydrating condensation of sorbitol that is produced from various starches abundantly existing as plant-derived resources and easily available, is most preferred.

The polycarbonate resin for use in the present invention may comprise a structural unit derived from a dihydroxy compound (hereinafter, sometimes referred to as "the other dihydroxy compound") other than the dihydroxy compound of the present invention.

As the other dihydroxy compound, a dihydroxy compound having a moiety represented by the following formula (1) in a part of the structure may be used.

[Chem. 8]

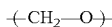

(1)

Here, the other dihydroxy compound having a moiety represented by formula (1) in a part of the structure excludes a cyclic ether structure-containing dihydroxy compound. More specifically, the other dihydroxy compound includes oxyalkylene glycols such as diethylene glycol, triethylene glycol and tetraethylene glycol; and compounds having an aromatic group in the side chain and having, in the main chain, an ether group bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene.

Among these other dihydroxy compounds, in view of availability, handleability, high reactivity during polymerization, and color hue of the obtained polycarbonate resin and polycarbonate resin composition, diethylene glycol and triethylene glycol are preferred.

Furthermore, a dihydroxy compound of an aliphatic hydrocarbon having a carbon number of 2 to 20 can be also used as the other dihydroxy compound. Here, the aliphatic hydrocarbon includes a linear aliphatic hydrocarbon, a branched aliphatic hydrocarbon, a cyclic aliphatic hydrocarbon, and a hydrocarbon having a plurality of these members. A dihydroxy compound of an aliphatic hydrocarbon having a carbon number of 2 to 20 is preferably used, a dihydroxy compound of an aliphatic hydrocarbon having a carbon number of 2 to 12 is more preferably used, and a dihydroxy compound of an aliphatic hydrocarbon having a carbon number of 2 to 8 is still more preferably used.

More specifically, the dihydroxy compound includes a dihydroxy compound of a linear aliphatic hydrocarbon, such as ethylene glycol, 1,3-propanediol, 1,2-propanediol, 1,4-butanediol, 1,3-butanediol, 1,2-butanediol, 1,5-heptanediol and 1,6-hexanediol. A dihydroxy compound of an alicyclic hydrocarbon, such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol and 1,3-adamantanedimethanol, may be also used.

Furthermore, the other dihydroxy compound includes aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl) methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene and 9,9-bis(4-hydroxy-2-methylphenyl)fluorene.

Among these other dihydroxy compounds, in view of light resistance of the polycarbonate resin and polycarbonate resin composition, use of a dihydroxy compounds having no aromatic ring structure is preferred. Among the aliphatic dihydroxy compound and/or the dihydroxy compound of an alicyclic hydrocarbon, as the aliphatic dihydroxy compound, 1,3-propanediol, 1,4-butanediol and 1,6-hexanediol are preferred; and as the dihydroxy compound of an alicyclic hydrocarbon, 1,4-cyclohexanedimethanol and tricyclodecanedimethanol are preferred.

By using the other dihydroxy compound, an effect of, for example, improvement in the flexibility, increase in the heat resistance or improvement in the moldability of the polycarbonate resin and polycarbonate resin composition may be obtained, but if the content ratio of the structural unit derived from the other dihydroxy compound is too large, this may cause reduction in the mechanical properties or reduction in the heat resistance. For this reason, the ratio of the structural unit derived from the dihydroxy compound of the present invention to structural units derived from all dihydroxy compounds is preferably 10 mol % or more, more preferably 20 mol % or more, still more preferably 30 mol % or more, yet still more preferably 40 mol % or more, even yet still more preferably 55 mol % or more, and preferably 95 mol % or less, more preferably 90 mol % or less, still more preferably 80 mol % or less, yet still more preferably 70 mol % or less, even yet still more preferably 50 mol % or less.

Among the other dihydroxy compounds, in the case of using an aliphatic dihydroxy compound, the ratio of the structural unit derived from the aliphatic dihydroxy compound to the structural units derived from all dihydroxy compounds is preferably 10 mol % or more, more preferably 20 mol % or more, still more preferably 30 mol % or more, yet still more preferably 40 mol % or more, and preferably 60 mol % or less, more preferably 55 mol % or less, still more preferably 53 mol % or less.

Also, from the standpoint of enhancing compatibility of the polycarbonate resin composition of the present invention with other resins, particularly, from the standpoint of enhancing compatibility with other polycarbonate resins, all structural units derived from a dihydroxy compound in the polycarbonate resin of the present invention are preferably composed of only a structural unit derived from the dihydroxy compound of the present invention and a structural unit derived from an aliphatic dihydroxy compound. In this case, the ratio between the structural unit derived from the dihydroxy compound of the present invention and the structural unit derived from an aliphatic dihydroxy compound is preferably, in terms of molar ratio, from 40 to 90 mol % of the structure unit derived from the dihydroxy compound of the present invention and from 60 to 10 mol % of the structural unit derived from an aliphatic dihydroxy compound.

The dihydroxy compound used for the polycarbonate resin of the present invention may contain a stabilizer such as reducing agent, antioxidant, deoxidizer, light stabilizer, antacid, pH stabilizer and heat stabilizer. In particular, the dihydroxy compound of the present invention is liable to change in quality under acidic conditions and therefore, preferably contains a basic stabilizer. The basic stabilizer includes a hydroxide, carbonate, phosphate, phosphite, hypophosphite, borate or fatty acid salt of a metal belonging to Group 1 or Group 2 of the long-form periodic table (Nomenclature of Inorganic Chemistry IUPAC Recommendations 2005) (hereinafter, sometimes simply referred to as long-form periodic table); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; and an amine compound such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline. Among these, in view of the effect and ease of the later-described removal by distillation, a phosphate or phosphite of sodium or potassium is preferred, and disodium hydrogenphosphate and disodium hydrogenphosphite are more preferred.

The content of the basic stabilizer in the dihydroxy compound of the present invention is not particularly limited, but if the content is too small, the effect of preventing the change in quality of the dihydroxy compound of the present invention may not be obtained, whereas if the content is too large, the dihydroxy compound of the present invention may cause a change in quality. For this reason, the content is usually 0.0001 mass % or more, preferably 0.001 mass % or more, and usually 1 mass % or less, preferably 0.1 mass % or less, based on the dihydroxy compound of the present invention.

Also, when the dihydroxy compound of the present invention comprising such a basic stabilizer is used as a raw material for the production of the polycarbonate resin, not only the basic stabilizer itself serves as a polymerization catalyst and therefore make it difficult to control the polymerization rate or quality, but also the basic stabilizer affects the initial color hue and as a result affects the light resistance of the molded article. Accordingly, the basic stabilizer is preferably removed, for example, with an ion-exchange resin or by distillation before using the dihydroxy compound as a raw material for the production of the polycarbonate resin.

When the dihydroxy compound of the present invention contains a cyclic ether structure, such as isosorbide, it is liable to be gradually oxidized by oxygen. Therefore, for preventing decomposition due to oxygen, it is important to allow for no inclusion of water during storage or production, use a deoxidizer or the like, or handle the dihydroxy compound in a nitrogen atmosphere. Oxidation of isosorbide may involve generation of a decomposition product such as formic acid. For example, when isosorbide containing such a decomposition product is used as a raw material for the production of the polycarbonate resin, this may incur coloring of the obtained polycarbonate resin and polycarbonate resin composition, and further the decomposition product may not only seriously deteriorate the physical properties but also affect the polymerization reaction, and therefore fail in obtaining a polymer having a high molecular weight.

In order to obtain the dihydroxy compound of the present invention free from the oxidative decomposition product or remove the basic stabilizer, purification by distillation is preferably performed. The distillation here may be either simple distillation or continuous distillation and is not particularly limited. As for the distillation conditions, distillation is preferably performed under reduced pressure in an inert gas atmosphere such as argon and nitrogen and for avoiding a change in quality by heat, is performed under the condition of usually 250° C. or less, preferably 200° C. or less, more preferably 180° C. or less.

By controlling, the content of formic acid in the dihydroxy compound of the present invention of 20 ppm by mass or less, preferably 10 ppm by mass or less, more preferably 5 ppm by mass or less with such purification by distillation, when a dihydroxy compound containing the dihydroxy compound of the present invention is used as a raw material for the production of a polycarbonate resin, the polymerization reactivity a polycarbonate resin and polycarbonate resin composition each excellent in the color hue and thermal stability can be produced without impairing polymerization reactivity. The content of formic acid is measured by ion chromatography.

(Carbonic Acid Diester)

The polycarbonate resin for use in the present invention can be obtained by polycondensation through a transesterification reaction using a dihydroxy compound containing the dihydroxy compound of the present invention and a carbonic acid diester as raw materials.

The carbonic acid diester used is usually a compound represented by the following formula (2). One of these carbonic acid diesters may be used alone, or two or more thereof may be mixed and used.

[Chem. 9]

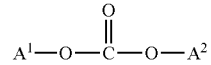

(2)

(in formula (2), $A^1$ and $A^2$ each independently represent a substituted or unsubstituted aliphatic group having a carbon number of 1 to 18 or a substituted or unsubstituted aromatic group).

Examples of the carbonic acid diester represented by formula (2) include diphenyl carbonate, substituted diphenyl carbonates such as ditolyl carbonate, and dialkyl carbonates such as dimethyl carbonate, diethyl carbonate and di-t-butyl carbonate. Diphenyl carbonate and substituted diphenyl carbonate are preferred, and diphenyl carbonate is more preferred. Incidentally, the carbonic acid diester sometimes contains an impurity such as chloride ions and since the impurity may inhibit the polymerization reaction or affect the color hue of the obtained polycarbonate resin and polycarbonate resin composition, it is preferred to use a carbonic acid diester that is purified by distillation or the like, if desired.

<Transesterification Reaction Catalyst>

The production process of the polycarbonate resin for use in the present invention is not particularly limited, but representative examples thereof include a method of performing a transesterification reaction between a dihydroxy compound containing the cyclic ether structure-containing dihydroxy compound of the present invention and a carbonic acid diester represented by formula (2) to produce a polycarbonate resin, more specifically, a method of performing the transesterification reaction in the presence of a transesterification reaction catalyst and removing the by-product such as monohydroxy compound produced during the transesterification reaction from the system.

The catalyst used is not limited as long as it can satisfy the light resistance, transparency, color hue, heat resistance, thermal stability and mechanical strength of the produced polycarbonate resin and polycarbonate resin composition, but the catalyst includes a compound of a metal belonging to Group 1 or Group 2 of the long-form periodic table (hereinafter, simply referred to as "Group 1" or "Group 2"), and a basic compound such as a basic boron compound, a basic phosphorus compound, a basic ammonium compound and an amine-based compound. Preferably, a Group 1 metal compound and/or a Group 2 metal compound are used. One of these catalysts may be used alone, or two or more thereof may be mixed and used.

Together with a Group 1 metal compound and/or a Group 2 metal compound, a basic compound such as a basic boron compound, a basic phosphorus compound, a basic ammonium compound and an amine-based compound may be supplementarily used in combination, but it is particularly preferred to use only a Group 1 metal compound and/or a Group 2 metal compound.

As for the form of the Group 1 metal compound and/or Group 2 metal compound, the compound is usually used in the form of a hydroxide or a salt such as carbonate, carboxylate and phenoxide, but a hydroxide, a carbonate and an acetate are preferred in view of availability and handleability, and an acetate is preferred in view of color hue and polymerization activity.

The Group 1 metal compound is, for example, a compound containing a Group 1 metal such as lithium, potassium and cesium. More specifically, examples of the Group 1 metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, sodium boron phenylate, potassium boron phenylate, lithium boron phenylate, cesium boron phenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A. Among these, lithium compounds are preferred.

The Group 2 metal compound is, for example, a compound containing a Group 2 metal such as magnesium, calcium, strontium and barium. More specifically, examples of the Group 2 metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, magnesium compounds, calcium compounds and barium compounds are preferred, and in view of the polymerization activity and the color hue of the obtained polycarbonate resin and polycarbonate resin composition, magnesium compounds and/or calcium compounds are more preferred, and calcium compounds are most preferred.

Examples of the basic boron compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst used is usually 0.1 μmol or more, preferably 0.5 μmol or more, and usually 300 mol or less, preferably 100 μmol or less, per mol of all dihydroxy compounds used for the polymerization. Among these, in the case of using a compound containing at least one metal selected from the group consisting of lithium and Group 2 of the long-form periodic table, particularly, in the case of using a magnesium compound and/or a calcium compound, the amount of the catalyst is, in terms of metal amount, usually 0.1 μmol or more, preferably 0.5 μmol or more, still more preferably 0.7 μmol or more, per mol of all dihydroxy compounds. The upper limit is usually 20 μmol, preferably 10 μmol, more preferably 3 μmol, still more preferably 1.5 μmol, yet still more preferably 1.0 μmol.

If the amount of the catalyst is too small, the polymerization rate is reduced, and the polymerization temperature must be raised so as to obtain a polycarbonate resin having a desired molecular weight, as a result, the color hue or light resistance of the obtained polycarbonate resin and polycarbonate resin composition may be affected, the unreacted raw material may volatilize during polymerization to disrupt the balance of molar ratio between a dihydroxy compound containing the dihydroxy compound of the present invention and the carbonic acid diester represented by formula (2), or a desired molecular weight may not be reached. On the other hand, if the amount of the polymerization catalyst used is too large, this may affect the color hue of the obtained polycarbonate resin and polycarbonate resin composition or may exercise an effect on the light resistance of the polycarbonate resin and polycarbonate resin composition.

Also, a Group 1 metal, among others, lithium, sodium, potassium and cesium, particularly, sodium, potassium and cesium, when contained in a large amount in the polycarbonate resin composition, may affect the color hue, and this metal may get mixed in out not only from the catalyst used but also from the raw material or reaction apparatus. Therefore, the total amount of these in the polycarbonate resin composition is, in terms of metal amount, usually 1 ppm by mass or less, preferably 0.8 ppm by mass or less, more preferably 0.7 ppm by mass or less.

The metal amount in the polycarbonate resin composition can be determined by recovering the metal in the polycarbonate resin composition by a method such as wet ashing and then measuring the metal amount, for example, by atomic emission, atomic absorption or Inductively Coupled Plasma (ICP) spectroscopy.

The polycarbonate resin used for the polycarbonate resin composition of the present invention sometimes comprises a small amount of various metals used as the catalyst. It is preferred that the polycarbonate resin contains at least one kind of a metal selected from lithium and a Group 2 metal of the long-form periodic table used as the catalyst and the total amount of metals contained is, in terms of metal amount, preferably 20 ppm by mass or less, more preferably 15 ppm by mass or less, still more preferably 12 ppm by mass or less. Thanks to such a content, a polycarbonate resin composition causing less coloring can be obtained and in turn, the resin composition can be reduced in L* by a coloring agent to have high-level jet-blackness and good image sharpness.

Also, in the polycarbonate resin composition, the content of the aromatic monohydroxy compound derived from the raw material or polycondensation reaction product is preferably 700 ppm by mass or less, more preferably 500 ppm by mass or less, still more preferably 300 ppm by mass or less. However, it is difficult in industry to completely remove the aromatic monohydroxy compound, and the lower limit of the content thereof is usually 1 ppm by mass.

Furthermore, in the case of producing the polycarbonate resin for use in the present invention by using, as the carbonic acid diester represented by formula (2), diphenyl carbonate or a substituted diphenyl carbonate such as ditolyl carbonate, it is unavoidable that phenol or a substituted phenol is produced as a by-product and remains in the polycarbonate resin, but both phenol and a substituted phenol have an aromatic ring and not only may absorb an ultraviolet ray to affect the light resistance but also may give rise to an odor during molding. In the polycarbonate resin after a normal batch reaction, 1,000 ppm by mass or more of an aromatic monohydroxy compound having an aromatic ring, such as by-product phenol, is contained, but in view of light resistance or decreasing the odor, the content thereof in the polycarbonate resin is preferably reduced to 700 ppm by mass or less, more preferably 500 ppm by mass or less, still more preferably 300 ppm by mass or less, by using a horizontal reaction vessel excellent in the devolatilizing performance or using an extruder with a vacuum vent. However, it is difficult in industry to completely remove the aromatic monohydroxy compound, and the lower limit of the content thereof is usually 1 ppm by mass.

Incidentally, such an aromatic monohydroxy compound may of course have a substituent depending on the raw materials used and may have, for example, an alkyl group having a carbon number of 5 or less.

<Production Process>

The method for producing the polycarbonate resin composition for use in the present invention is described in detail below. The polycarbonate resin for use in the present invention can be obtained, for example, by polycondensation through a transesterification reaction between a dihydroxy compound containing the dihydroxy compound of the present invention and a carbonic acid diester of formula (2). The dihydroxy compound and the carbonic acid diester as raw materials are preferably mixed uniformly before the transesterification reaction.

The mixing temperature is usually 80° C. or more, preferably 90° C. or more, more preferably 100° C. or more, and the upper limit thereof is usually 250° C. or less, preferably 200° C. or less, more preferably 150° C. or less, still more preferably 120° C. or less. If the mixing temperature is too low, this may give rise to a low dissolution rate or insufficient solubility and may influence the solidification or the like, whereas if the mixing temperature is too high, thermal deterioration of the dihydroxy compound may be caused, as a result, the color hue of the obtained polycarbonate resin and polycarbonate resin composition may be changed to adversely affect the light resistance.

In view of the effect on the color hue, the operation of mixing a dihydroxy compound containing the dihydroxy compound of the present invention and a carbonic acid diester represented by formula (2), which are raw materials of the polycarbonate resin for use in the present invention, is preferably performed in an atmosphere having an oxygen concentration of usually 0.0001 vol % or more and usually 10 vol % or less, preferably 5 vol % or less, more preferably 1 vol % or less.

For obtaining the resin used in the present invention, the carbonic acid diester represented by formula (2) is preferably used in a molar ratio of usually 0.90 or more, preferably 0.95 or more, and usually 1.20 or less, preferably 1.10 or less, based on the dihydroxy compound containing the dihydroxy compound of the present invention.

If this molar ratio is small, the polycarbonate resin produced may be increased in the terminal hydroxyl group to affect the thermal stability of the polymer, or the transesterification reaction rate may be decreased, making it difficult to obtain a desired high-molecular polymer.

Also, if the molar ratio is increased, the transesterification reaction rate may be reduced or it may become difficult to produce a polycarbonate having a desired molecular weight. The reduction in the transesterification reaction rate causes an increase in the heat history during polymerization reaction and in turn, may affect the color hue or light resistance of the polycarbonate resin obtained.

Furthermore, if the molar ratio of the carbonic acid diester represented by formula (2) to the dihydroxy compound containing the dihydroxy compound of the present invention is increased, the amount of the residual carbonic acid diester in the obtained polycarbonate resin is increased, and such a residual carbonic acid diester may absorb an ultraviolet ray to affect the light resistance of the polycarbonate resin and polycarbonate resin composition. The concentration of the carbonic acid diester remaining in the polycarbonate resin composition for use in the present invention is usually 200 ppm by mass or less, preferably 100 ppm by mass or less, more preferably 60 ppm by mass or less, still more preferably 30 ppm by mass or less. Actually, the polycarbonate resin composition sometimes contains an unreacted carbonic acid diester, and the lower limit of the concentration is usually 1 ppm by mass.

In the present invention, the method for causing polycondensation of the dihydroxy compound with the carbonic acid diester is performed in the presence of the above-described catalyst usually in multiple stages by using a plurality of reaction vessels. The mode of reaction operation may be any of a batch system, a continuous system, and a combination of a batch system and a continuous system.

The polymerization is preferably performed at a relatively low temperature under relatively low vacuum in its initial stage to obtain a prepolymer and is performed at a relatively high temperature under relatively high vacuum in the later stage of polymerization to increase the molecular weight to a predetermined value, but in view of color hue and light resistance, it is important to appropriately select the jacket temperature, the internal temperature and the pressure inside the system in the stage of each molecular weight. For example, if either one of the temperature and the pressure is changed excessively early before the polymerization reaction reaches a predetermined value, an unreacted monomer may be distilled off to disrupt the balance of molar ratio between the dihydroxy compound and the carbonic acid diester, giving rise to a decrease in the polymerization rate or a failure in obtaining a polymer having a predetermined molecular weight or terminal group, as a result, the object of the present invention may not be achieved.

For reducing the amount of a monomer distilled off, it is effective to use a reflux condenser in the polymerization reaction vessel, and its effect is large particularly for the reaction vessel in the initial stage of polymerization, in which many unreacted monomers are generated. The temperature of the cooling medium introduced into the reflux condenser may be appropriately selected according to the monomers used, but the temperature of the cooling medium introduced into the reflux condenser is, at the inlet of the reflux condenser, usually 45° C. or more, preferably 80° C. or more, more preferably 100° C. or more, and usually 180° C. or less, preferably 150° C. or less, more preferably 130°

C. or less. If the temperature of the cooling medium introduced into the reflux condenser is too high, the reflux amount may decrease to reduce the effect, whereas if the temperature is too low, the distillation efficiency for the monohydroxy compound that should be originally removed by distillation tends to decrease. As the cooling medium, warm water, steam, heating medium oil or the like is used, and steam or a heating medium oil is preferred.

For not impairing the color hue, thermal stability, light resistance and the like of the finally obtained polycarbonate resin and polycarbonate resin composition while appropriately maintaining the polymerization rate and suppressing distillation off of monomers, selection of the kind and amount of the catalyst described above is important.

The polycarbonate resin for use in the present invention is preferably produced by polymerization using a catalyst, which is performed in multiple stages by using a plurality of reaction vessels, and the reason why the polymerization is performed using a plurality of reaction vessels is that: in the initial stage of polymerization reaction, the content of monomers in the reaction solution is large and therefore, it is important to suppress volatilization of monomers while maintaining a necessary polymerization rate; and in the later stage of polymerization reaction, it is important to sufficiently distill off the by-product monohydroxy compound so as to shift the equilibrium to the polymerization side. For setting different polymerization reaction conditions as above, it is preferred in view of production efficiency to use a plurality of polymerization reaction vessels arranged in series.

The number of reaction vessels used in the method of the present invention may be sufficient if it is at least 2 or more as described above, but in view of production efficiency and the like, the number of reaction vessels is preferably 3 or more, more preferably from 3 to 5, still more preferably 4.

In the present invention, when two or more reaction vessels are used, the reaction vessel may be designed to, for example, further have a plurality of reaction stages differing in the conditions or be continuously changed in the temperature•pressure.

In the present invention, the polymerization catalyst may be mixed in a raw material preparation tank or a raw material storage tank or may be mixed directly in a polymerization tank, but in view of stability of feed and control of polymerization, the catalyst is preferably fed in the form of an aqueous solution by disposing a catalyst feed line in the middle of a raw material line before feed to a polymerization tank.

If the polymerization reaction temperature is too low, a decrease in productivity or an increase in heat history of the product may be brought about, whereas if the temperature is too high, not only volatilization of monomers is incurred but also decomposition or coloring of the polycarbonate resin and polycarbonate resin composition may be promoted.

Specifically, the reaction in the first stage is performed at a temperature of, in terms of maximum internal temperature of the polymerization reaction vessel, usually 140° C. or more, preferably 180° C. or more, more preferably 200° C. or more, and usually 270° C. or less, preferably 240° C. or less, more preferably 230° C. or less, under a pressure of usually 1 kPa or more, preferably 5 kPa or more, more preferably 10 kPa or more, and usually 110 kPa or less, preferably 70 kPa or less, more preferably 30 kPa or less (absolute pressure), for a time period of usually 0.1 hours or more, preferably 0.5 hours or more, and usually 10 hours or less, preferably 3 hours or less, while removing the generated monohydroxy compound by distillation from the reaction system.

In the second and subsequent stages, the pressure of the reaction system is gradually lowered from the pressure used in the first stage, and the polymerization is performed under a pressure (absolute pressure) of the reaction system finally lowered to 200 Pa or less, at a maximum internal temperature of usually 210° C. or more, preferably 220° C. or more, and usually 270° C. or less, preferably 250° C. or less, for a time period of usually 0.1 hours or more, preferably 0.5 hours or more, more preferably 1 hour or more, and usually 10 hours or less, preferably 6 hours or less, more preferably 3 hours or less, while removing the continuously generated monohydroxy compound from the reaction system.

In order to obtain a polycarbonate resin and a polycarbonate resin composition each excellent in the color hue and light resistance, the maximum internal temperature in all reaction stages is preferably less than 250° C., more preferably from 225 to 245° C. Also, for inhibiting lowering of the polymerization rate in the latter half of polymerization reaction and minimizing deterioration due to heat history, it is preferred to use, in the final stage of polymerization, a horizontal reaction vessel excellent in plug-flow characteristics and interface renewal property.

In view of effective utilization of resources, the by-product monohydroxy compound is preferably purified, if desired, and then reused as a raw material of diphenyl carbonate, bisphenol A or the like.

The polycarbonate resin for use in the present invention is usually cooled/solidified after performing the polycondensation as described above and then pelletized by a rotary cutter or the like.

The method for pelletization is not limited, but examples thereof include: a method where the resin is withdrawn in a molten state from the final polymerization reaction vessel, cooled/solidified in the form of a strand, and then pelletized; a method where the resin is fed in a molten state from the final polymerization reaction vessel to a single- or twin-screw extruder, melt-extruded, cooled/solidified, and then pelletized; and a method where the resin is withdrawn in a molten state from the final polymerization reaction vessel, cooled/solidified in the form of a strand form and once pelletized and thereafter, the resin is again fed to a single- or twin-screw extruder, melt-extruded, cooled/solidified, and then pelletized.

At this time, reduced-pressure devolatilization of a residual monomer, or mixing and kneading of a heat stabilizer, a neutralizing agent, an ultraviolet absorber, a release agent, a coloring agent, an antistatic agent, a slip agent, a lubricant, a plasticizer, a compatibilizer, a flame retardant and the like, which are usually known, may be also performed in the extruder.

The melt kneading temperature in the extruder depends on the glass transition temperature or molecular weight of the polycarbonate resin but is usually 150° C. or more, preferably 200° C. or more, more preferably 230° C. or more, and usually 300° C. or less, preferably 270° C. or less, more preferably 260° C. or less. If the melt kneading temperature is less than 150° C., the melt viscosity of the polycarbonate resin becomes high to increase the load on the extruder and the productivity decreases, whereas if the melt kneading temperature exceeds 300° C., thermal deterioration of the polycarbonate proceeds in a harsh manner and a decrease in the molecular weight involves reduction in the mechanical strength, coloring, and gas evolution.

At the production of the polycarbonate resin for use in the present invention, a filter is preferably provided so as to prevent inclusion of an extraneous matter. The position at which the filter is provided is preferably on the downstream side of the extruder, and the rejection size (opening size) of the filter for an extraneous matter is preferably 100 µm or less in terms of filtration accuracy for 99% removal. Particularly, in the case of avoiding inclusion of a fine extraneous matter in the film application or the like, the rejection size is preferably 40 µm or less, more preferably 10 µm or less.

In order to prevent inclusion of an extraneous matter after extrusion, the extrusion of the polycarbonate resin for use in the present invention is preferably performed in a clean room where the cleanliness is preferably higher than class 7, more preferably higher than class 6, as defined in JIS B 9920 (2002).

Also, at the time of cooling and chipping the extruded polycarbonate resin, a cooling method such as air cooling and water cooling is preferably used. As for the air used in air cooling, an air from which an airborne extraneous matter is previously removed with a hepafilter or the like is preferably used so as to prevent reattachment of an airborne extraneous matter. In the case of employing water cooling, water from which a metallic matter is removed with an ion-exchange resin or the like and an extraneous matter in water is removed through a filter, is preferably used. The opening size of the filter used is preferably from 10 to 0.45 µm in terms of filtration accuracy for 99% removal.

The molecular weight of the thus-obtained polycarbonate resin for use in the present invention can be expressed by a reduced viscosity, and the reduced viscosity is usually 0.30 dL/g or more, preferably 0.35 dL/g or more. The upper limit of the reduced viscosity is 1.20 dL/g or less, preferably 1.00 dL/g or less, more preferably 0.80 dL/g or less.

If the reduced viscosity of the polycarbonate resin is too small, the mechanical strength of the molded article may be low, whereas if the reduced viscosity is too large, the flowability tends to decrease during molding, giving rise to reduction in the productivity and moldability.

Incidentally, the reduced viscosity is determined by preparing a solution having a polycarbonate concentration precisely adjusted to 0.6 g/dL with use of methylene chloride as a solvent and measuring the viscosity by means of an Ubbelohde viscometer at a temperature of 20.0° C.±0.1° C.

The lower limit of the concentration of the terminal group represented by the following formula (6) in the polycarbonate resin for use in the present invention is usually 20 µeq/g, preferably 40 µeq/g, more preferably 50 µeq/g, and the upper limit is usually 160 µeq/g, preferably 140 µeq/g, more preferably 100 µeq/g.

If the concentration of the terminal group represented by formula (6) in the polycarbonate resin for use in the present invention is too high, even when the color hue immediately after polymerization or during molding is good, the high concentration may affect the color hue after exposure to an ultraviolet ray, whereas if the concentration is too low, thermal stability may be reduced.

Examples of the method for controlling the concentration of the terminal group represented by the following formula (6) include: a method of controlling the molar ratio between raw materials, that is, a dihydroxy compound containing the dihydroxy compound of the present invention and a carbonic acid diester represented by formula (2); and a method of controlling the kind or amount of a catalyst, the polymerization pressure, or the polymerization temperature, at the transesterification reaction.

[Chem. 10]

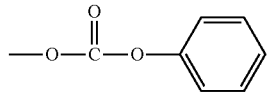
(6)

Also, assuming that the molar number of H bonded to the aromatic ring in the polycarbonate resin for use in the present invention is (A) and the molar number of H bonded to a site other than the aromatic ring is (B), the ratio of the molar number of H bonded to the aromatic rings to the molar number of all H is expressed by A/(A+B), and since the aromatic ring having an ultraviolet absorbing ability may affect the light resistance as described above, the ratio A/(A+B) is preferably 0.1 or less, more preferably 0.05 or less, still more preferably 0.02 or less, yet still more preferably 0.01 or less. The value of A/(A+B) can be quantitatively determined by $^1$H-NMR.

The coloring agent blended in the polycarbonate resin composition for use in the present invention is not particularly limited in its incorporation timing and incorporation method. The incorporation timing is, for example, at the completion of polymerization reaction when producing the polycarbonate resin by a transesterification method; irrespective of the polymerization method, in the state of the polycarbonate resin being melted, such as in the middle of kneading of the polycarbonate resin and other compounding ingredients; or at the blending•kneading with the polycarbonate resin in a solid state such as pellet or powder by using an extruder or the like. As for the incorporation method, a method of mixing or kneading the coloring agent directly with the polycarbonate resin may be employed; or the coloring agent may be mixed as a high-concentration masterbatch produced using the coloring agent and a small amount of a polycarbonate resin, another resin or the like. In view of jet-blackness and image sharpness, a method of directly mixing or kneading the coloring agent is preferred.

<Other Resins>

For improving the impact resistance or surface hardness, the resin composition of the present invention may contain resins other than the polycarbonate resin of the present invention. Other resins are not particularly limited, but in terms of maintaining high-level jet-blackness and image sharpness, a resin having a complete compatibility with the polycarbonate resin of the present invention is preferred, and above all, various polycarbonate resins are preferred. Furthermore, among various polycarbonate resins, those having a refractive index close to that of the polycarbonate resin of the present invention are preferred.

<Impact Resistance Improver>

In the present invention, the impact resistance is evaluated by a Charpy impact test. The result of the Charpy impact test is indicative of tenacity (toughness) of the molded article of the resin composition, and a resin composition exhibiting a higher value is less susceptible to brittle fracture. The resin composition of the present invention exhibits a high value as compared with a resin having a high surface hardness, such as acryl. Furthermore, a high Charpy impact strength can be achieved by incorporating a generally known resin having β dispersion, such as polycarbonate resin, into the resin composition of the present invention, by elevating the molecular weight of the resin having β dispersion to a high molecular weight, or by adding an impact improver (graft rubber, elastomer) or a filler (e.g., reinforced fiber) to the resin composition of the present invention. However, when an impact improver or a filler (e.g., reinforced fiber) is added, the image sharpness on the molded article surface may be impaired. Therefore, it is preferred to incorporate a resin having β dispersion, such as polycarbonate resin. In addition, when the molecular weight of the resin having β dispersion is elevated to a high molecular weight, a prolongation of reaction time or a temperature rise, which is associated with the elevation to a high molecular weight, may affect the color hue of the resin to disadvantageously increase the L* value of the molded article.

<Antioxidant>

The resin composition of the present invention may further contain an antioxidant. As the antioxidant, various general antioxidants used for a resin may be used, but in view of oxidation stability, thermal stability, jet-blackness and the like, a phosphite-based antioxidant, a sulfur-based antioxidant, and a phenolic antioxidant are preferred.

Here, the content of the antioxidant is usually 0.0001 parts by mass or more, preferably 0.0005 parts by mass or more, more preferably 0.001 parts by mass or more, and usually 5 parts by mass or less, preferably 3 parts by mass or less, more preferably 2 parts by mass or less, per 100 parts by mass of the polycarbonate resin.

If the content is excessively small, the effect of inhibiting coloring at the molding may be insufficient, whereas if the content is too large, a deposit on the mold at the injection molding or a deposit on the roll when molding a film by extrusion molding may be increased to affect the surface appearance of the product.

(Phosphite-Based Antioxidant)

Examples of the phosphite-based antioxidant include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, and distearyl pentaerythritol diphosphite.

Among these, trisnonylphenyl phosphite, trimethyl phosphate, tris(2,4-di-tert-butylphenyl)phosphite, bis(2,4-di-tert-butylphenyl)pentaerythritol diphosphite and bis(2,6-di-tert-butyl-4-methylphenyl)pentaerythritol diphosphite are preferably used. These compounds can be used individually or in combination of two or more thereof.

The content of the phosphite-based antioxidant is usually 0.0001 parts by mass or more, more preferably 0.0002 parts by mass or more, and usually 1 part by mass or less, preferably 0.1 parts by mass or less, more preferably 0.01 parts by mass or less, per 100 parts by mass of the polycarbonate resin.

If the content above is too small, the effect of inhibiting coloring at the molding may be insufficient, whereas if the content is too large, a deposit on the mold at the injection molding or a deposit on the roll when molding a film by extrusion molding may be increased to affect the surface appearance of the product.

(Sulfur-Based Antioxidant)

Examples of the sulfur-based antioxidant include dilauryl 3,3'-thiodipropionate, ditridecyl 3,3'-thiodipropionate, dimyristyl 3,3'-thiodipropionate, distearyl 3,3'-thiodipropionate, lauryl stearyl 3,3'-thiodipropionate, pentaerythritol tetrakis(3-laurylthiopropionate), bis[2-methyl-4-(3-laurylthiopropionyloxy)-5-tert-butylphenyl]sulfide, octadecyl disulfide, mercaptobenzimidazole, 2-mercapto-6-methylbenzimidazole, and 1,1'-thiobis(2-naphthol). Among these, pentaerythritol tetrakis(3-laurylthiopropionate) is preferred.

The content of the sulfur-based antioxidant is usually 0.0001 parts by mass or more, preferably 0.0002 parts by mass or more, and usually 1 part by mass or less, preferably 0.1 parts by mass or less, more preferably 0.01 part by mass or less, per 100 parts by mass of the polycarbonate resin.

If the content above is too small, the effect of inhibiting coloring at the molding may be insufficient, whereas if the content is too large, a deposit on the mold at the injection molding or a deposit on the roll when molding a film by extrusion molding may be increased to impair the surface appearance of the product.

Even when the polycarbonate resin composition of the present invention contains a phosphite-based antioxidant alone or a sulfur-based antioxidant alone, the effect of inhibiting coloring is poor. A high effect of inhibiting coloring at the molding can be exerted by containing both antioxidants.

(Phenolic Antioxidant)

Examples of the phenolic antioxidant include compounds such as pentaerythritol tetrakis(3-mercaptopropionate), pentaerythritol tetrakis(3-laurylthiopropionate), glycerol-3-stearylthiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), diethyl 3,5-di-tert-butyl-4-hydroxy-benzylphosphonate, tris(3,5-di-tert-butyl-4-hydroxybenzyl) isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

Among these compounds, an aromatic monohydroxy compound substituted with one or more alkyl groups having a carbon number of 5 or more is preferred. Specifically, octadecyl-3-(3,5-di-t-butyl-4-hydroxyphenyl)propionate, pentaerythrityl-tetrakis {3-(3,5-di-tert-butyl-4-hydroxyphenyl)propionate}, 1,6-hexanediol-bis[3-(3,5-di-tert-butyl-4-hydroxyphenyl)propionate], 1,3,5-trimethyl-2,4,6-tris(3,5-di-tert-butyl-4-hydroxybenzyl)benzene, and the like are preferred, and pentaerythrityl-tetrakis{3-(3,5-di-tert-butyl-4-hydroxyphenyl)propionate is more preferred.

The content of the phenolic antioxidant is usually 0.0001 parts by mass or more, preferably 0.0002 parts by mass or more, and usually 1 part by mass or less, preferably 0.1 parts by mass or less, more preferably 0.01 parts by mass or less, per 100 parts by mass of the polycarbonate resin.

If the content above is too small, the effect of inhibiting coloring at the molding may be insufficient, whereas if the content is too large, a deposit on the mold at the injection molding or a deposit on the roll when molding a film by extrusion molding may be increased to affect the surface appearance of the product.

<Flame Retardant>

Also, a polycarbonate resin composition where a flame retardant is blended in the polycarbonate resin for use in the present invention, is prepared. The blending amount of the flame retardant is selected according to the kind of the flame retardant or the degree of flame retardancy. In this embodiment, the blending amount of the flame retardant is usually 0.01 parts by mass or more, preferably 0.02 parts by mass or more, and usually 30 parts by mass or less, preferably 25 parts by mass or less, per 100 parts by mass of the polycarbonate resin. By blending a flame retardant, a polycarbonate resin composition excellent in the flame retardancy is obtained.

Examples of the flame retardant include a phosphorus-containing compound-based flame retardant, a halogen-containing compound-based flame retardant, a sulfonic acid metal salt-based flame retardant, and a silicon-containing compound-based flame retardant. In this embodiment, at least one member selected from this group of flame retardants can be used. One of these flame retardants is used alone, or two or more thereof are used in combination.

Examples of the phosphorus-containing compound-based flame retardant include a phosphoric acid ester-based compound, a phosphazene-based compound, red phosphorus, a coated red phosphorus, and a polyphosphate-based compound. The blending amount of the phosphorus-containing compound-based flame retardant is preferably from 0.1 to 20 parts by mass per 100 parts by mass of the polycarbonate resin. If the blending amount is too small, adequate flame retardancy can be hardly obtained, whereas if the blending amount is too large, the heat resistance is liable to decrease.

Examples of the halogen-containing compound-based flame retardant include tetrabromobisphenol A, tribromophenol, brominated aromatic triazine, a tetrabromobisphenol A epoxy oligomer, a tetrabromobisphenol A epoxy polymer, decabromodiphenyl oxide, tribromoallyl ether, a tetrabromobisphenol A carbonate oligomer, ethylenebistetrabromophthalimide, decabromodiphenylethane, brominated polystyrene, and hexabromocyclo dodecane.

The blending amount of the halogen-containing compound-based flame retardant is from 0.1 to 20 parts by mass per 100 parts by mass of the polycarbonate resin. If the blending amount of the halogen-containing compound-based flame retardant is too small, adequate flame retardancy can be hardly obtained, whereas if the blending amount is too large, the mechanical strength may decrease or the flame retardant may bleed to cause discoloration.

Examples of the sulfonic acid metal salt-based flame retardant include an aliphatic sulfonic acid metal salt, an aromatic sulfonic acid metal salt, and a perfluoroalkane-sulfonic acid metal salt. Preferred examples of the metal of such a metal salt include a metal belonging to Group 1 of the periodic table and a metal belonging to Group 2 of the periodic table. These are specifically an alkali metal such as lithium, sodium, potassium, rubidium and cesium; an alkaline earth metal such as calcium, strontium and barium; beryllium, and magnesium.

Among sulfonic acid metal salt-based flame retardants, in view of flame retardancy and thermal stability, an aromatic sulfonesulfonic acid metal salt, a perfluoroalkane-sulfonic acid metal salt, and the like are preferred.

As the aromatic sulfonesulfonic acid metal salt, an aromatic sulfonesulfonic acid alkali metal salt and an aromatic sulfonesulfonic acid alkaline earth metal salt are preferred. These salts may be a polymer. Specific examples of the aromatic sulfonesulfonic acid metal salt include a sodium salt of diphenylsulfone-3-sulfonic acid, a potassium salt of diphenylsulfone-3-sulfonic acid, a sodium salt of 4,4'-dibromodiphenyl-sulfone-3-sulfonic acid, a potassium salt of 4,4'-dibromodiphenyl-sulfone-3-sulfone, a calcium salt of 4-chloro-4'-nitrodiphenylsulfone-3-sulfonic acid, a disodium salt of diphenylsulfone-3,3'-disulfonic acid, and a dipotassium salt of diphenylsulfone-3,3'-disulfonic acid.

Preferred examples of the perfluoroalkane-sulfonic acid metal salt include an alkali metal salt of perfluoroalkane-sulfonic acid and an alkaline earth metal salt of perfluoroalkane-sulfonic acid, and more preferred examples include a sulfonic acid alkali metal salt containing a perfluoroalkane group having a carbon number of 4 to 8, and a sulfonic acid alkaline earth metal salt containing a perfluoroalkane group having a carbon number of 4 to 8.

Specific examples of the perfluoroalkane-sulfonic acid metal salt include sodium perfluorobutane-sulfonate, potassium perfluorobutane-sulfonate, sodium perfluoromethylbutane-sulfonate, potassium perfluoromethylbutane-sulfonate, sodium perfluorooctane-sulfonate, potassium perfluorooctane-sulfonate, and tetraethylammonium salt of perfluorobutane-sulfonic acid.

The blending amount of the sulfonic acid metal salt-based flame retardant is preferably from 0.01 to 5 parts by mass per 100 parts by mass of the polycarbonate resin. If the blending amount of the sulfonic acid metal salt-based flame retardant is too small, adequate flame retardancy can be hardly obtained, whereas if the blending amount is too large, the thermal stability is liable to decrease.

Examples of the silicon-containing compound-based flame retardant include silicone varnish, a silicone resin where the substituent bonded to silicon atom is composed of an aromatic hydrocarbon group and an aliphatic hydrocarbon group having a carbon number of 2 or more, a silicone compound having a branched structure as the main chain and having an aromatic group in the organic functional group contained, a silicone powder having on the silicone powder surface a polydiorganosiloxane polymer which may have a functional group, and an organopolysiloxane-polycarbonate copolymer. Among these, silicone varnish is preferred.

The silicone varnish includes, for example, a solution-like silicone resin having a relatively low molecular weight, which is mainly composed of a bifunctional unit $[(RO)_2SiO]$ and a trifunctional unit $[(RO)SiO_{1.5}]$ and may contain a monofunctional unit $[(RO)_3SiO_{0.5}]$ and/or a tetrafunctional unit $[SiO_2]$. Here, R is a hydrocarbon group having a carbon number of 1 to 12 or a hydrocarbon group having a carbon number of 1 to 12 and being substituted with one or more substituents. Examples of the substituent include an epoxy group, an amino group, a hydroxyl group, and a vinyl group. The compatibility with the matrix resin can be improved by changing the kind of RO.

Examples of the silicone varnish include a solventless silicone varnish and a solvent-containing silicone varnish. In this embodiment, a silicone varnish not containing a solvent is preferred. The silicone varnish can be produced, for example, by hydrolysis of an alkylalkoxysilane such as alkyltrialkoxysilane, dialkyldialkoxysilane, trialkylalkoxysilane and tetraalkoxysilane. The molecular structure (crosslinking degree) and the molecular weight can be controlled by adjusting the molar ratio of these raw materials, the hydrolysis rate, and the like. An alkoxysilane may remain depending on the production conditions, but its remaining in the composition sometimes gives rise to reduction in the hydrolysis resistance of the polycarbonate resin composition and therefore, the amount of the residual alkoxysilane is preferably small or zero.

The viscosity of the silicone varnish is preferably 300 cSt or less, more preferably 250 cSt or less, still more preferably 200 cSt or less. If the viscosity of the silicone varnish is too large, the flame retardancy may be inadequate.

The blending amount of the silicon-containing compound-based flame retardant is preferably from 0.1 to 10 parts by mass per 100 parts by mass of the polycarbonate resin. If the blending amount of the silicon-containing compound-based flame retardant is too small, adequate flame retardancy can be hardly obtained, whereas if the blending amount is too large, the thermal resistance is liable to decrease.

In this embodiment, a polytetrafluoroethylene for dripping prevention is preferably used in combination so as to achieve higher flame retardancy. The polytetrafluoroethylene for dripping prevention shows a tendency to easily disperse in a polymer and combine polymers with each other to form a fibrous material. Examples of the product commercially available as a polytetrafluoroethylene for dripping prevention include Teflon (registered trademark) 6J, Teflon (registered trademark) 30 J (both from Du Pont-Mitsui Fluorochemicals Company, Ltd.), and Polyflon F201L (from Daikin Industries, Ltd.).

The blending amount of the polytetrafluoroethylene for dripping prevention is preferably from 0.01 to 2.0 parts by mass per 100 parts by mass of the polycarbonate resin. If the blending amount of the polytetrafluoroethylene for dripping prevention is too small, the effect of preventing melt dripping during burning is insufficient, whereas if the blending amount is too large, this may affect the appearance of the molded article.

In this embodiment, the antioxidant and flame retardant blended in the polycarbonate resin composition are not particularly limited in their mixing timing and mixing method. The mixing timing is, for example, at the completion of polymerization reaction when producing the polycarbonate resin by a transesterification method; irrespective of the polymerization method, in the state of the polycarbonate resin being melted, such as in the middle of kneading of the polycarbonate resin and other compounding ingredients; or at the blending•kneading with the polycarbonate resin in a solid state such as pellet or powder by using an extruder or the like. As for the mixing method, a method of mixing or kneading the antioxidant directly with the polycarbonate resin may be employed; or the antioxidant may be mixed as a high-concentration masterbatch produced using the antioxidant and a small amount of a polycarbonate resin, another resin or the like.

<Other Additives>

A method of adding a slip agent to reduce the surface resistance of the resin may be employed so as to increase the scratch hardness, but when a slip agent is added, the image sharpness on the surface of the molded article may be impaired. Therefore, the amount of the slip agent must be kept to the minimum necessary in the polycarbonate resin composition containing a polycarbonate resin having a structure unit derived from the cyclic ether structure-containing dihydroxy compound of the present invention and a coloring agent.

The method for producing a resin molded article from the polycarbonate resin composition of the present invention is not particularly limited, and a molding method generally employed for a thermoplastic resin, that is, such as general injection molding method, ultrahigh-speed injection molding method, injection compression molding method, two-color molding method, gas-assisted blow molding method, molding method using an insulated mold, molding method using a rapidly heating mold, expansion molding (including supercritical fluid), insert molding method, IMC (in-mold coating molding) method, extrusion molding method, sheet molding method, thermoforming method, rotational molding method, lamination molding method and press molding method, can be employed. In addition, a molding method using a hot runner system may be also selected.

EXAMPLES

The present invention is described in greater detail below by referring to Examples, but the present invention should not be construed as being limited to the following Examples, as long as the purport of the present invention is observed.
(1) Measurement of Metal Concentration in Polycarbonate Composition Resin About 0.5 g of a pellet of a polycarbonate resin composition was accurately weighed in a microwave decomposition vessel manufactured by PerkinElmer Inc., and 2 mL of 97% sulfuric acid was added thereto. This vessel was closed and microwave-heated at 230° C. for 10 minutes and after the vessel was cooled to room temperature, 1.5 mL of 68% nitric acid was added thereto. This vessel was closed, microwave-heated at 150° C. for 10 minutes, and again cooled to room temperature, and 2.5 mL of 68% nitric acid was added. This vessel was again closed and microwave-heated at 230° C. for 10 minutes to completely decompose the contents. After the vessel was cooled to room temperature, the obtained liquid was diluted with pure water and measured for the metal concentration by ICP-MS manufactured by Thermo Quest Corp.
(2) Measurement of Ratio of Structural Units Derived from Respective Dihydroxy Compounds in Polycarbonate Resin Composition and Concentration of Terminal Phenyl Group As for the ratio of structural units derived from respective dihydroxy compounds in the polycarbonate resin composition, 30 mg of the polycarbonate resin composition was weighed and dissolved in about 0.7 mL of chloroform-d to make a solution, and this solution was introduced into the NMR tube having an inner diameter of 5 mm and measured for the $^1$H-NMR spectrum at ordinary temperature by using JNM-AL400 (resonance frequency: 400 MHz), manufactured by JEOL Ltd. The ratio of structural units derived from respective dihydroxy compounds was determined from the intensity ratio of signals based on structural units derived from respective dihydroxy compounds. As for the concentration of the terminal phenyl group, the $^1$H-NMR was measured in the same manner as above by using 1,1,2,2-tetrabromoethane as the internal standard, and the concentration was determined from the intensity ratio of signals based on internal standard and terminal phenyl group, respectively.
(3) Measurement of Reduced Viscosity A sample of a polycarbonate resin composition was dissolved using methylene chloride as a solvent to prepare a polycarbonate solution having a concentration of 0.6 g/dL. Using a Ubbelohde viscometer tube manufactured by Moritomo Rika Kogyo, measurement was performed at a temperature of 20.0° C.±0.1° C., and the relative viscosity ηrel was determined from the solvent flow time $t_0$ and the solution flow time t according to the following formula:

$$\eta rel = t/t_0$$

The specific viscosity lisp was determined from the relative viscosity according to the following formula:

$$\eta sp = (\eta - \eta_0)/\eta_0 = \eta rel - 1$$

The specific viscosity was divided by the concentration c (g/dL) to determine the reduced viscosity ηsp/c. A larger value indicates a higher molecular weight.
(4) Measurement of Phenol Concentration and DPC (Diphenyl Carbonate) Concentration in Polycarbonate Resin Composition A 1.25 g portion of a sample of a polycarbonate resin composition was dissolved in 7 ml of methylene chloride to form a solution, and acetone was added thereto to make a total amount of 25 ml, thereby performing a reprecipitation treatment. Subsequently, the treated solution was filtered through a 0.2 μm disk filter and quantitatively determined by liquid chromatography.

(5) Ratio of Molar Number (A) of H Bonded to Aromatic Ring to Molar Number (A+B) of all H (Here, B is the Molar Number of H not Bonded to Aromatic Ring)

Only chloroform-d previously added and mixed with tetramethylsilane (TMS) as the internal standard substance was measured for spectrum to determine the ratio of signals of TMS and residual H contained in the chloroform-d. Subsequently, 30 mg of a polycarbonate resin composition was weighed and dissolved in about 0.7 mL of the chloroform-d above. The resulting solution was introduced into a NMR tube having an inner diameter of 5 mm and measured for the $^1$H-NMR spectrum at ordinary temperature by using JNM-AL400 (resonance frequency: 400 MHz) manufactured by JEOL Ltd. Assuming that the value obtained by subtracting the integral value of the signal of residual H contained in the chloroform-d (the integral value is determined from the integral value of the signal of TMS and the ratio of TMS to residual H contained in the chloroform-d determined above in advance) from the integral value of the signal appearing at 6.5 to 8.0 ppm in the obtained NMR chart is a and the integral value of the signal appearing at 0.5 to 6.5 ppm is b, a relationship of $a/(a+b)=A/(A+B)$ is established and therefore, this ratio was determined.

(6) L* Value by JIS K7105 (1981)

A resin composition pellet was dried at 110° C. for 4 hours or longer and then molded using an injection molding machine, Model M150AII-SJ, manufactured by Meiki Seisakusho Co., Ltd., under the conditions of a cylinder temperature of 270° C., a mold temperature of 80° C. and a molding cycle of 55 seconds to prepare an ASTM test specimen and a plate-like molded article (90 mm×50 mm×3 mm (thickness)). The L* value of the molded article was measured using the plate-like molded article (90 mm×50 mm×3 mm (thickness)) in accordance with JIS K7105 by means of a spectral colorimeter (reflection method), Model SE2000, manufactured by Nippon Denshoku Kogyo K.K. A smaller value indicates higher blackness.

(7) L* Value by JIS Z8729 (2004)

A molded article was prepared by the same method as in the case of measuring the L* value by JIS K7105, and the L* value of the resin composition by JIS Z8729 was measured using the plate-like molded article (90 mm×50 mm×3 mm (thickness)) in accordance with JIS Z8729 by means of a spectral colorimeter, COLOR-7x, manufactured by Kurabo Industries Ltd. The color-difference formula CIE 1976 L*a*b* was used for calculation. A smaller value indicates higher blackness.

(8) Reflectance

A molded article was prepared by the same method as in the case of measuring the L* value by JIS K7105, and the reflectance of the resin composition was measured using the plate-like molded article (90 mm×50 mm×3 mm (thickness)) in accordance with JIS Z8729 by means of a spectral colorimeter, COLOR-7x, manufactured by Kurabo Industries Ltd. The reflectance was measured every 10 nm in the wavelength range of 400 to 700 nm, and the average value was determined and taken as the reflectance.

(9) Weather Resistance Test (Difference in Reflectance Between Before and after Test)

Metaling Weather Meter M6T manufactured by Suga Test Instruments Co., Ltd. was used. Under the conditions of 63° C. and a relative humidity of 50%, a horizontal metaling lamp as a light source and quartz as an inner filter were attached thereto, a #500 filter was also attached as an outer filter to the periphery of the lamp, and after setting to give an irradiance of 1.5 kw/m² for the wavelength range of 300 to 400 nm, a square surface of the obtained injection molded plate (60 mm (width)×60 mm (length)×3 mm (thickness)) was irradiated with light for 100 hours. The reflectance of the resin composition was measured using the plate-like molded article (90 mm×50 mm×3 mm (thickness)) in accordance with JIS Z8729 by means of a spectral colorimeter, COLOR-7x, manufactured by Kurabo Industries Ltd. The reflectance was measured every 10 nm in the wavelength range of 400 to 700 nm, and the average value was determined. The difference in reflectance between before and after test was determined by subtracting the reflectance before test from the reflectance after test.

(10) Impact Resistance

Result of Charpy Impact Test

The result of the Charpy impact test of the molded article of the resin composition was measured by a Charpy impact test (unit: kg-cm/cm²) based on JIS K-7111 (2006).

(11) Surface Hardness

The scratch hardness of the molded article of the resin composition was evaluated in accordance with JIS K5600-5-4 (1999).

(12) Jet-Blackness of Resin Composition

The outer appearance of the plate-like molded article (90 mm×50 mm×3 mm (thickness)) produced above was observed with an eye, and the jet-blackness of the resin composition was rated A when dullness or haze was not observed, rated B when dullness or haze was slightly observed, and rated C when dullness or haze was clearly observed. The jet-blackness by this observation with an eye showed a high correlation with the L* value by JIS Z8729.

(13) Image Sharpness

The outer appearance of the plate-like molded article (90 mm×50 mm×3 mm (thickness)) produced above was observed with an eye, and the image sharpness of the resin composition was rated A when upon reflecting a fluorescent lighting tube on the coating surface under a fluorescent lamp, unevenness was not observed and the fluorescent lighting tube was reflected as a straight tube, and rated C when significant unevenness was observed or the fluorescent lighting tube was reflected as a distorted tube.

(14) Flame Retardancy

A pellet kneaded in a twin-screw extruder was predried at 80° C. for 4 hours and molded using an injection molding machine, Model J75EII, manufactured by The Japan Steel Works, Ltd. under the conditions of a cylinder temperature of 230° C., a molding cycle of 45 seconds and a mold temperature of 60° C. to prepare a burning test specimen of 1.5 mmt in accordance with UL94 standards. The obtained test specimen was subjected to a vertical burning test of UL94 standards and evaluated.

(15) Heat Retention Test

The surface appearance of the plate-like molded article (90 mm×50 mm×3 mm (thickness)) produced above was observed with an eye, and the heat retention stability was rated A when roughening due to a silver streak was not observed, and rated B when roughening due to a silver streak was slightly observed.

Incidentally, abbreviations of compounds used in the following Examples are as follows.
ISB: Isosorbide (POLYSORB, trade name, produced by Roquette Froeres)
CHDM: 1,4-Cyclohexanedimethanol (produced by Eastman)
DPC: Diphenyl carbonate (produced by Mitsubishi Chemical)

Example 1

Into a polymerization reaction apparatus equipped with a stirring blade and a reflux condenser controlled to 100° C., ISB, CHDM, DPC having a chloride ion concentration adjusted to 10 ppb or less by distillation purification, and calcium acetate monohydrate were charged to give a molar ratio of ISB/CHDM/DPC/calcium acetate monohydrate=0.70/0.30/1.00/1.3×10$^{-6}$, followed by thorough nitrogen substitution (oxygen concentration: from 0.0005 to 0.001 vol %). Subsequently, heating with a heating medium was performed and when the internal temperature reached 100° C., stirring was started. The contents were melted and homogenized while controlling the system to keep the internal temperature at 100° C. Thereafter, heating was started to raise the internal temperature to 210° C. over 40 minutes. When the internal temperature reached 215° C., the system was controlled to keep this temperature and at the same time, decompression was started to reduce the pressure to 13.3 kPa (absolute pressure, hereinafter the same) in 90 minutes after the internal temperature reached 215° C. While keeping this pressure, the system was held for another 60 minutes. The phenol vapor by-produced along with the polymerization reaction was introduced to the reflux condenser using, as a cooling medium, a steam controlled to 100° C. in terms of the inlet temperature to the reflux condenser and while returning the monomer components contained in a slight amount in the phenol vapor to the polymerization reaction vessel, the uncondensed phenol vapor was subsequently introduced to a condenser using, as a cooling medium, warm water at 45° C. and recovered.

After the pressure was once returned to atmospheric pressure, the contents oligomerized above were transferred to another polymerization reaction apparatus equipped with a stirring blade and a reflux condenser controlled similarly to the above, and heating and decompression were started to reach an internal temperature of 220° C. and a pressure of 200 Pa in 60 minutes. Thereafter, the system was set to an internal temperature of 230° C. and a pressure of 133 Pa or less over 20 minutes, and when a predetermined stirring power was reached, the pressure was returned. The contents were withdrawn in the form of a strand and pelletized by a rotary cutter.

Using a twin-screw extruder having two vent holes (LABOTEX30HSS-32) manufactured by The Japan Steel Works, Ltd., the pellet obtained was extruded into a strand form at an outlet resin temperature of 250° C. The extrudate was cooled/solidified with water and then pelletized by a rotary cutter. At this time, the vent hole was connected to a vacuum pump and controlled such that the pressure becomes 500 Pa at the vent hole. As a result, a polycarbonate resin having a low yellowness, an excellent brightness, and a good color tone was obtained. The light resistance was also good.

Various analysis values of the polycarbonate resin obtain in Example 1 are shown below.
Ca Concentration: 1.3 µmol/dihydroxy compound
Cs Concentration: less than measurement limit
Na, K and Cs Concentrations: 0.6 ppm by mass
Li Concentration: less than measurement limit
Phenol: 205 ppm by mass
Carbonic acid diester: 26 ppm by mass
Terminal phenyl group: 75 µeq/g
Reduced viscosity: 0.48 dL/g
A/(A+B): 0.007 mol/mol A polycarbonate resin composition was prepared using the obtained polycarbonate resin. In a tumbler mixer, as dyes, 0.1 parts by mass of Macrolex Violet 3R (Color Index No. Solvent Violet 36) produced by Bayer AG, 0.01 parts by mass of Diaregin Blue H3G produced by Mitsubishi Chemical Corporation, 0.1 parts by mass of Oil Green 5602 (Color Index No. Solvent Green 3) produced by Arimoto Chemical Co., Ltd. (all are an anthraquinone-based dye), and 0.05 parts by mass of Macrolex Yellow 6G (Color Index No. Solvent Yellow 179) produced by Lanxess; as antioxidants, 0.1 parts by mass of Irganox 1010 produced by BASF Japan and 0.05 parts by mass of Irgafos 168 produced by BASF Japan; and as a flame retardant, 8 parts by mass of PX-200 produced by Daihachi Chemical Industry Co., Ltd. were uniformly mixed per 100 parts by mass of the polycarbonate resin. The resultant mixture was fed to a twin-screw extruder (TEX30XCT, manufactured by The Japan Steel Works, Ltd., L/D=42, number of barrels: 12) through a barrel 1 thereof and melt-kneaded in the extruder at a cylinder temperature of 270° C. and a screw rotating speed of 200 rpm to produce a pellet of a resin composition.

A molded article of a polycarbonate resin composition was produced using the obtained pellet.

The pellet obtained by the method above was dried at 110° C. for 4 hours or more and then molded using an injection molding machine, Model M150AII-SJ, manufactured by Meiki Co., Ltd., under the conditions of a cylinder temperature of 270° C., a mold temperature of 80° C. and a molding cycle of 55 seconds to prepare an ASTM test specimen and a plate-like molded article (90 mm×50 mm×3 mm (thickness)).

As seen from Table 1, the molded article of the resin composition obtained in Example 1 satisfied all of jet-blackness, image sharpness, impact resistance, surface hardness and heat retention stability.

Comparative Example 1

An aromatic polycarbonate resin (Novarex 7022J, produced by Mitsubishi Engineering-Plastics Corporation) was mixed with an anthraquinone-based dye, a methine-based dye, an antioxidant and a flame retardant in the same manner as in Example 1 to make a resin composition. Furthermore, a molded article was prepared under the same conditions as in Example, and evaluation results thereof are shown in Table 1.

Comparative Example 2

A methyl polymethacrylate resin (ACRYPET MD001, produced by Mitsubishi Rayon Co., Ltd.; hereinafter referred to as PMMA resin) was mixed with an anthraquinone-based dye, a methine-based dye, an antioxidant and a flame retardant in the same manner as in Example 1 to make a resin composition. Furthermore, a molded article was prepared under the same conditions as in Example, and evaluation results thereof are shown in Table 1.

Comparative Example 3

An acrylonitrile butadiene styrene copolymer resin (TECHNO ABS 150, produced by Technopolymer Co., Ltd.;

hereinafter referred to as ABS resin) was mixed with an anthraquinone-based dye, a methine-based dye, an antioxidant and a flame retardant in the same manner as in Example 1 to make a resin composition. Furthermore, a molded article was prepared under the same conditions as in Example, and evaluation results thereof are shown in Table 1.

Example 3

Using the polycarbonate resin obtained in Example 1, in a tumbler mixer, as coloring agents, 0.01 parts by mass of Macrolex Violet 3R (Color Index No. Solvent Violet 36) produced by Lanxess, 0.01 parts by mass of Macrolex Red E2G (Color Index No. Solvent Red 179) produced by Lanxess, 0.04 parts by mass of Oil Green 5602 (Color Index No. Solvent Green 3) produced by Arimoto Chemical Co., Ltd., and 0.04 parts by mass of Macrolex Blue RR (Color Index No. Solvent Blue 97) produced by Lanxess; and as antioxidants, 0.1 parts by mass of ADK STAB AO-60 produced by ADEKA Corporation and 0.05 parts by mass of ADK STAB 2112 produced by ADEKA Corporation were uniformly mixed per 100 parts by mass of the polycarbonate resin. The resultant mixture was melt-kneaded using a single-screw extruder at a cylinder temperature of 240° C. to produce a pellet of a resin composition.

A molded article of a polycarbonate resin composition was produced using the obtained pellet.

The pellet obtained by the method above was dried at 110° C. for 4 hours or more and then molded using an injection molding machine, Model M150AII-SJ, manufactured by Meiki Co., Ltd., under the conditions of a cylinder temperature of 240° C., a mold temperature of 80° C. and a molding cycle of 55 seconds to prepare an ASTM test specimen and a plate-like molded article (90 mm×50 mm×3 mm (thickness)).

As seen from Table 1, the molded article of the resin composition obtained in Example 3 satisfied all of jet-blackness, image sharpness, impact resistance, surface hardness and heat retention stability.

Example 2

A pellet was obtained in the same manner as in Example 3 except for using, as coloring agents, 0.01 parts by mass of Macrolex Violet 3R (Color Index No. Solvent Violet 36) produced by Lanxess, 0.03 parts by mass of Macrolex Red E2G (Color Index No. Solvent Red 179) produced by Lanxess, 0.05 parts by mass of Oil Green 5602 (Color Index No. Solvent Green 3) produced by Arimoto Chemical Co., Ltd., and 0.01 parts by mass of Macrolex Blue RR (Color Index No. Solvent Blue 97) produced by Lanxess in Example 3.

Using the pellet above, an ASTM test specimen and a plate-like molded article (90 mm×50 mm×3 mm (thickness)) were produced in the same manner as in Example 3.

As seen from Table 1, the molded article of the resin composition obtained in Example 2 satisfied all of jet-blackness, image sharpness, impact resistance, surface hardness and heat retention stability.

Comparative Example 5

In a tumbler mixer, as coloring agents, 0.01 parts by mass of Macrolex Violet 3R (Color Index No. Solvent Violet 36) produced by Lanxess, 0.01 parts by mass of Macrolex Red E2G (Color Index No. Solvent Red 179) produced by Lanxess, 0.04 parts by mass of Oil Green 5602 (Color Index No. Solvent Green 3) produced by Arimoto Chemical Co., Ltd., and 0.04 parts by mass of Macrolex Blue RR (Color Index No. Solvent Blue 97) produced by Lanxess; and as antioxidants, 0.1 parts by mass of ADK STAB AO-60 produced by ADEKA Corporation and 0.05 parts by mass of ADK STAB 2112 produced by ADEKA Corporation were uniformly mixed per 100 parts by mass of a polycarbonate resin (Novarex 7022A, produced by Mitsubishi Engineering-Plastics Corporation). The resultant mixture was melt-kneaded using a single-screw extruder at a cylinder temperature of 290° C. to produce a pellet of a resin composition.

A molded article of a polycarbonate resin composition was produced using the obtained pellet.

The pellet obtained by the method above was dried at 110° C. for 4 hours or more and then molded using an injection molding machine, Model M150AII-SJ, manufactured by Meiki Co., Ltd., under the conditions of a cylinder temperature of 290° C., a mold temperature of 80° C. and a molding cycle of 55 seconds to prepare an ASTM test specimen and a plate-like molded article (90 mm×50 mm×3 mm (thickness)).

Comparative Example 4

A pellet was obtained in the same manner as in Comparative Example 5 except for using, as coloring agents, 0.01 parts by mass of Macrolex Violet 3R (Color Index No. Solvent Violet 36) produced by Lanxess, 0.03 parts by mass of Macrolex Red E2G (Color Index No. Solvent Red 179) produced by Lanxess, 0.05 parts by mass of Oil Green 5602 (Color Index No. Solvent Green 3) produced by Arimoto Chemical Co., Ltd., and 0.01 parts by mass of Macrolex Blue RR (Color Index No. Solvent Blue 97) produced by Lanxess in Comparative Example 5.

Using the pellet above, an ASTM test specimen and a plate-like molded article (90 mm×50 mm×3 mm (thickness)) were produced in the same manner as in Comparative Example 5.

Example 4

Using the polycarbonate resin obtained in Example 1, in a tumbler mixer, as coloring agents, 0.015 parts by mass of Color Index No. Pigment White 6, 0.012 parts by mass of Color Index No. Pigment Red 101, 0.005 parts by mass of Color Index No. Pigment Brown 24, 0.02 parts by mass of Color Index No. Pigment Blue 29, and 0.12 parts by mass of Color Index No. Pigment Black 7; as antioxidants, 0.1 parts by mass of ADK STAB AO-60 produced by ADEKA Corporation and 0.05 parts by mass of ADK STAB 2112 produced by ADEKA Corporation; and as a hindered amine-based light stabilizer, 0.05 parts by mass of Tinuvin 770DF produced by BASF Japan were uniformly mixed per 100 parts by mass of the polycarbonate resin. The resultant mixture was melt-kneaded using a single-screw extruder at a cylinder temperature of 240° C. to produce a pellet of a resin composition.

A molded article of a polycarbonate resin composition was produced using the obtained pellet.

The pellet obtained by the method above was dried at 110° C. for 4 hours or more and then molded using an injection molding machine, Model M150AII-SJ, manufactured by Meiki Co., Ltd., under the conditions of a cylinder temperature of 240° C., a mold temperature of 80° C. and a molding cycle of 55 seconds to prepare an ASTM test specimen and a plate-like molded article (90 mm×50 mm×3 mm (thickness)).

As seen from Table 1, the molded article of the resin composition obtained in Example 4 satisfied all of jet-blackness, image sharpness, impact resistance, surface hardness and heat retention stability.

As apparent from Table 1, the molded article of the resin composition of the present invention is excellent in jet-blackness and image sharpness and at the same time, satisfies all of impact resistance, scratch resistance owing to high surface hardness, flame retardancy and heat retention stability. Specifically, when the injection molded article (cylinder temperature: 280° C., mold temperature: 80° C., molding cycle: 55 seconds, 90 mm×50 mm×3 mm (thickness)) of the resin composition is observed with an eye, it is understood that a resin composition and a molded article satisfying the following characteristics at the same time are provided, that is, i) the molded article takes on deep-tone jet-blackness free from dullness or haze, ii) upon reflecting a fluorescent lighting tube on the coating surface under a fluorescent lamp, unevenness is not observed and the fluorescent lighting tube is reflected as a straight tube, iii) the Charpy impact strength is 10 kJ/m or more, iv) the surface hardness is H or more, v) the result of the vertical burning test of UL94 standards is V-2 or more, and vi) by taking residence molding for 5 minutes as one cycle, the surface of the residence molded article in 5th shot or later is free from roughening due to a silver streak.

TABLE 1

| | Kind of Resin | Unit | Example 1 Isosorbide Polycarbonate | Comparative Example 1 Aromatic Polycarbonate | Comparative Example 2 PMMA | Comparative Example 3 ABS |
|---|---|---|---|---|---|---|
| Coloring Agent | Solvent Violet 36 | parts by mass | 0.1 | 0.1 | 0.1 | 0.1 |
| | Diaresin Blue H3G | parts by mass | 0.01 | 0.01 | 0.01 | 0.01 |
| | Solvent Green 3 | parts by mass | 0.1 | 0.1 | 0.1 | 0.1 |
| | Solvent Yellow 179 | parts by mass | 0.05 | 0.05 | 0.05 | 0.05 |
| | Solvent Red 179 | parts by mass | — | — | — | — |
| | Solvent Blue 97 | parts by mass | — | — | — | — |
| | Pigment White 6 | parts by mass | — | — | — | — |
| | Pigment Red 101 | parts by mass | — | — | — | — |
| | Pigment Brown 24 | parts by mass | — | — | — | — |
| | Pigment Blue 29 | parts by mass | — | — | — | — |
| | Pigment Black 7 | parts by mass | — | — | — | — |
| | Total | parts by mass | 0.26 | 0.26 | 0.26 | 0.26 |
| Antioxidant | Irganox 1010 | parts by mass | 0.1 | 0.1 | 0.1 | 0.1 |
| | Irgafos 168 | parts by mass | 0.05 | 0.05 | 0.05 | 0.05 |
| Hindered amine-based light stabilizer | Tinuvin 770 DF | parts by mass | — | — | — | — |
| Flame retardant | PX-200 | parts by mass | 8 | 8 | 8 | 8 |
| L * value | according to JIS K7105 (reflection method), 3 mmt | — | 1.08 | 1.35 | 1.63 | 8.99 |
| L * value | JIS Z8729 (CIE 1976 L * a * b * color system), 3 mmt | — | 23.3 | 26.7 | 26.6 | 27.2 |
| Reflectance before weather resistance test | 400-700 nm, average | % | — | — | — | — |
| Reflectance after weather resistance test | 400-700 nm, average | % | — | — | — | — |
| ΔReflectance | 400-700 nm, average | % | — | — | — | — |
| Charpy Impact strength | JIS K7111 | kJ/m | 10 | 67 | 2 | 20 |
| Surface hardness | according to JIS K5600-5-4 | — | H | 3B | 2H | 3B |
| Jet-blackness | Observation of appearance with eye | — | A | B | B | C |
| Image sharpness | Observation of appearance with eye | — | A | A | A | C |
| Flame retardancy | UL-94, 1.5 mmt | — | V-2 | V-2 | C | C |
| Heat retention test | Observation of appearance with eye | — | A | B | B | B |

| | Kind of Resin | Unit | Example 2 Isosorbide Polycarbonate | Example 3 Isosorbide Polycarbonate | Comparative Example 4 Aromatic Polycarbonate | Comparative Example 5 Aromatic Polycarbonate | Example 4 Isosorbide polycarbonate |
|---|---|---|---|---|---|---|---|
| Coloring Agent | Solvent Violet 36 | parts by mass | 0.01 | 0.01 | 0.01 | 0.01 | — |
| | Diaresin Blue H3G | parts by mass | — | — | — | — | — |
| | Solvent Green 3 | parts by mass | 0.05 | 0.04 | 0.05 | 0.04 | — |
| | Solvent Yellow 179 | parts by mass | — | — | — | — | — |
| | Solvent Red 179 | parts by mass | 0.03 | 0.01 | 0.03 | 0.01 | — |
| | Solvent Blue 97 | parts by mass | 0.01 | 0.04 | 0.01 | 0.04 | — |
| | Pigment White 6 | parts by mass | — | — | — | — | 0.015 |
| | Pigment Red 101 | parts by mass | — | — | — | — | 0.012 |

TABLE 1-continued

|  |  |  |  |  |  |  |  |
|---|---|---|---|---|---|---|---|
|  | Pigment Brown 24 | parts by mass | — | — | — | — | 0.005 |
|  | Pigment Blue 29 | parts by mass | — | — | — | — | 0.02 |
|  | Pigment Black 7 | parts by mass | — | — | — | — | 0.12 |
|  | Total | parts by mass | 0.1 | 0.1 | 0.1 | 0.1 | 0.172 |
| Antioxidant | ADK STAB AO-60 | parts by mass | 0.1 | 0.1 | 0.1 | 0.1 | 0.1 |
|  | ADK STAB 2112 | parts by mass | 0.05 | 0.05 | 0.05 | 0.05 | 0.05 |
| Hindered amine-based light stabilizer | Tinuvin 770 DF | parts by mass | — | — | — | — | 0.05 |
| Flame retardant | PX-200 | parts by mass | — | — | — | — | — |
| L* value | according to JIS K7105 (reflection method), 3 mmt | — | 0.8 | 0.7 | 0.7 | 1 | 3.39 |
| L* value | JIS Z8729 (CIE 1976 L* a* b* color system), 3 mmt | — | 23.3 | 23.3 | 26.7 | 26.7 | 24.5 |
| Reflectance before weather resistance test | 400-700 nm, average | % | 3.93 | 3.96 | 5.04 | 5.06 | — |
| Reflectance after weather resistance test | 400-700 nm, average | % | 3.93 | 3.97 | 5.12 | 5.16 | — |
| ΔReflectance | 400-700 nm, average | % | 0 | 0.01 | 0.08 | 0.1 | — |
| Charpy Impact strength | JIS K7111 | kJ/m | 10 | 10 | 70 | 70 | 9 |
| Surface hardness | according to JIS K5600-5-4 | — | H | H | 3B | 3B | H |
| Jet-blackness | Observation of appearance with eye | — | A | A | B | B | A |
| Image sharpness | Observation of appearance with eye | — | A | A | A | A | A |
| Flame retardancy | UL-94, 1.5 mmt | — | V-2 | V-2 | V-2 | V-2 | V-2 |
| Heat retention test | Observation of appearance with eye | — | A | A | B | B | A |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-030736) filed on Feb. 16, 2011, the contents of which are incorporated herein by way of reference.

INDUSTRIAL APPLICABILITY

The resin composition and the molded article of the present invention can be used over a wide range of fields allowing a product to be imparted with a high-grade appearance and a dignified impression and can be expected to find their application, for example, in housings for electric, electronic and OA devices, automotive interior or exterior parts, and other daily life-related exterior parts.

The invention claimed is:

1. A polycarbonate resin composition comprising a polycarbonate resin and a coloring agent, wherein said polycarbonate resin composition has an L* value of 6 or less as measured by the reflected light method of JIS K7105 wherein the polycarbonate resin is obtained by polycondensation of a cyclic ether structure-containing dihydroxy compound represented by the following formula (3):

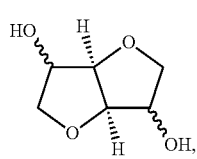

an aliphatic dihydroxy compound having a carbon number of 2 to 12; and
a carbonic acid diester represented by the following formula (2):

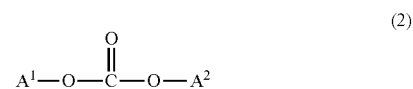

in formula (2), $A^1$ and $A^2$ each independently represent a substituted or unsubstituted aliphatic group having a carbon number of 1 to 18 or a substituted or unsubstituted aromatic group, and $A^1$ and $A^2$ may be the same or different.

2. The polycarbonate resin composition according to claim 1, wherein the content of the coloring agent comprised in the polycarbonate resin composition is from 0.001 to 3 parts by mass per 100 parts by mass of the polycarbonate resin.

3. The polycarbonate resin composition according to claim 1, wherein the coloring agent comprises a coloring agent having a maximum absorption wavelength in the range of 550 to 600 nm, a coloring agent having a maximum absorption wavelength in the range of 580 to 680 nm, and a coloring agent having a maximum absorption wavelength in the range of 640 to 690 nm.

4. The polycarbonate resin composition according to claim 1, wherein the coloring agent is an organic dye.

5. The polycarbonate resin composition according to claim 1, wherein the polycarbonate resin comprises from 40 to 90 mol % of a structural unit derived from a cyclic ether structure-containing dihydroxy compound and from 60 to 10 mol % of a structural unit derived from an aliphatic dihydroxy compound, based on structural units derived from all dihydroxy compounds.

6. The polycarbonate resin composition according to claim 1, which comprises from 0.0001 to 5 parts by mass of an antioxidant per 100 parts by mass of the polycarbonate resin.

7. The polycarbonate resin composition according to claim 1, which comprises from 0.01 to 30 parts by mass of a flame retardant per 100 parts by mass of the polycarbonate resin.

8. The polycarbonate resin composition according to claim 1, which comprises from 0.01 to 30 parts by mass of a hindered amine-based light stabilizer per 100 parts by mass of the polycarbonate resin.

9. The polycarbonate resin composition according to claim 1, wherein the polycarbonate resin composition comprises 700 ppm by mass or less of an aromatic monohydroxy compound.

10. The polycarbonate resin composition according to claim 1, wherein the polycarbonate resin composition comprises 60 ppm by mass or less of a carbonic acid diester represented by the following formula (2):

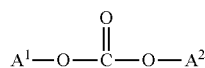
(2)

in formula (2), $A^1$ and $A^2$ each independently represent a substituted or unsubstituted aliphatic group having a carbon number of 1 to 18 or a substituted or unsubstituted aromatic group, and $A^1$ and $A^2$ may be the same or different.

11. The polycarbonate resin composition according to claim 1, wherein the polycondensation temperature of the polycarbonate resin is less than 250° C.

12. A polycarbonate resin molded article obtained by molding the polycarbonate resin composition according to claim 1.

13. The polycarbonate resin molded article according to claim 12, wherein the polycarbonate resin molded article is molded by an injection molding method.

* * * * *